| | | | |
|---|---|---|---|
| Presentation $i$ | | $P^i$ | Presentation Frame |
| | Question 1 Group | $Q_1^i$ | Question Frame |
| | | $C.D._1^i$ | Control Data |
| | | $P_1^i a$ | Alternative Presentation Frame |
| | | $R_1^i$ | Remedial Frame (Incomprehension) |
| | | $C_1^i$ | Remedial Frame (Confusion) |
| | | $A_1^i$ | Remedial Frame (Lack of Achievement) |
| | | $S_1^i$ | Success Reinforcement Frame |
| | Question 2 Group | $Q_2^i$ | |
| | | $C.D._2^i$ | |
| | | $S_2^i$ | |
| | Question 3 Group | $Q_3^i$ | |
| | | $S_3^i$ | |
| | Question 4 Group | $Q_4^i$ | |
| | | $S_4^i$ | |

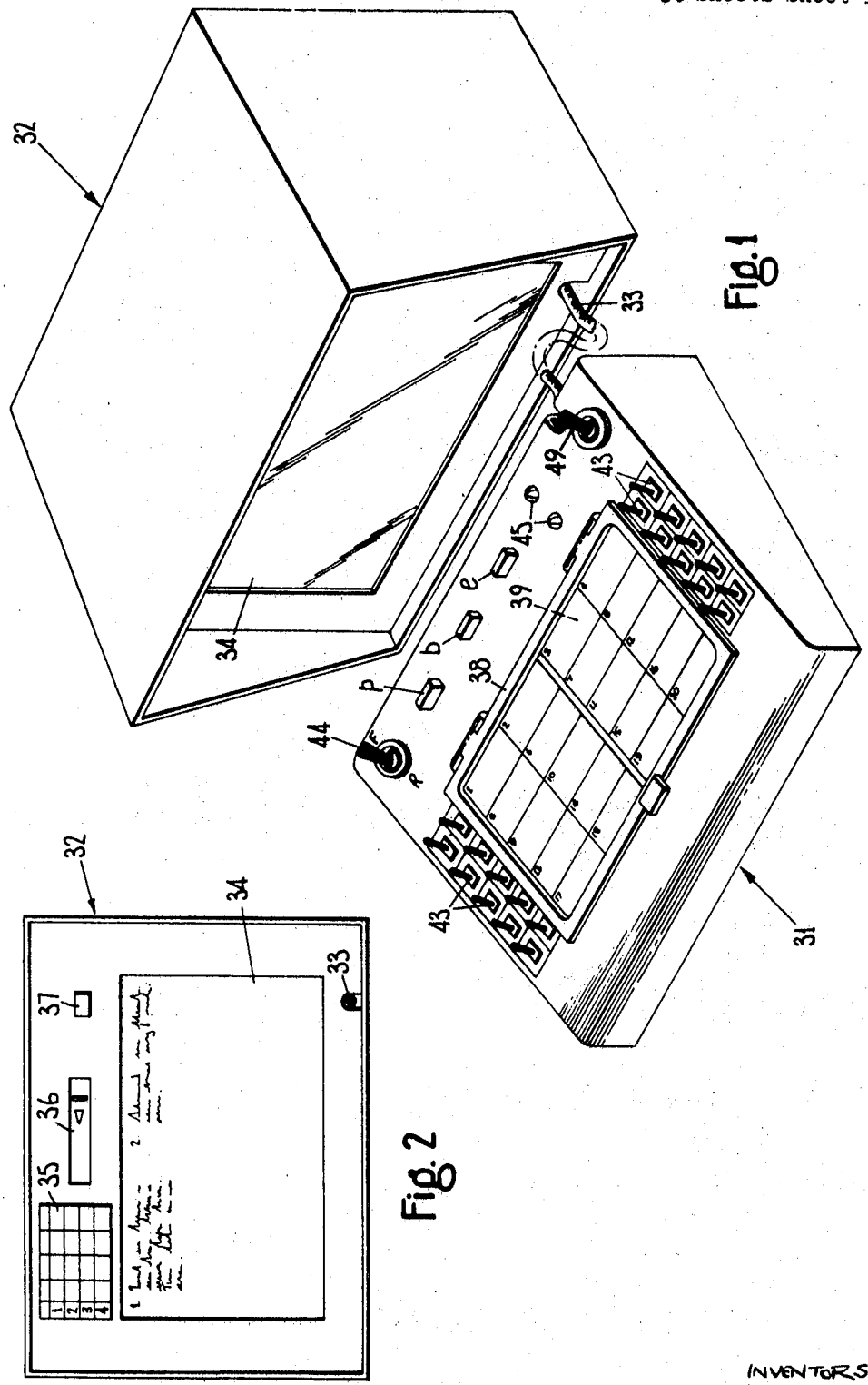

Fig. 3

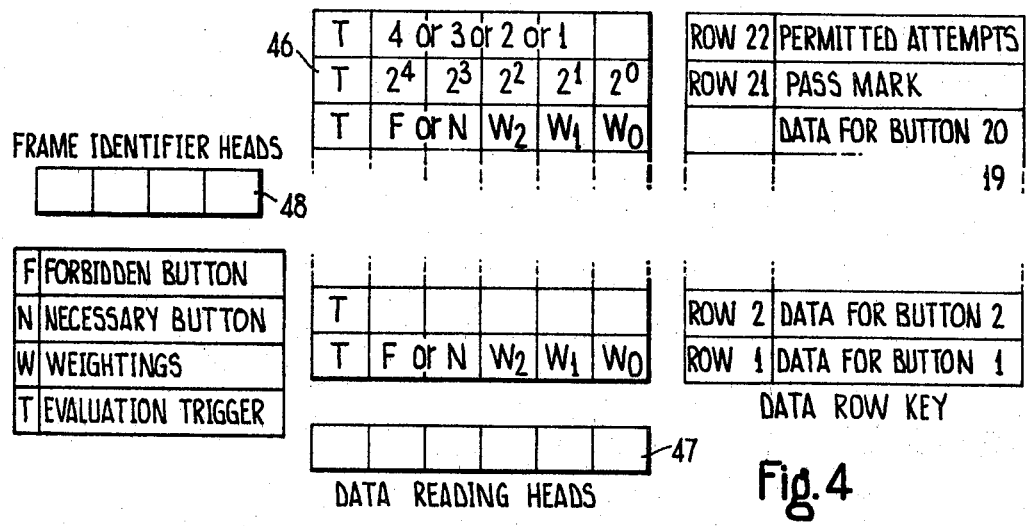
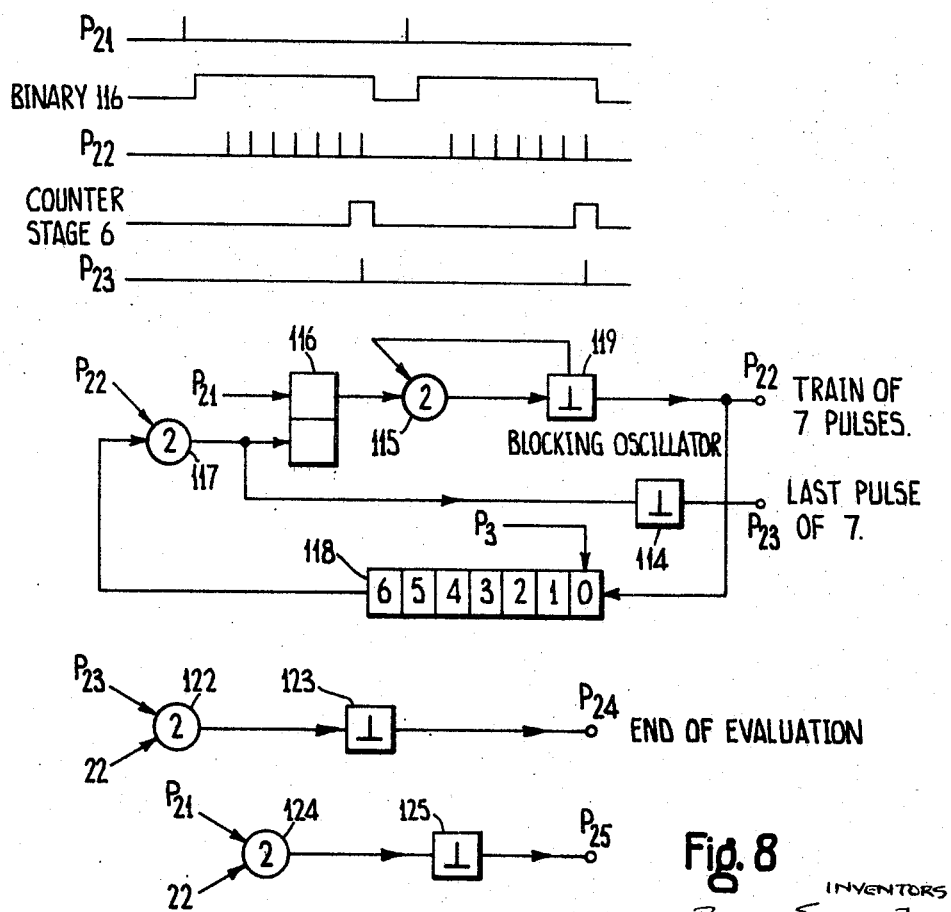
Fig. 8

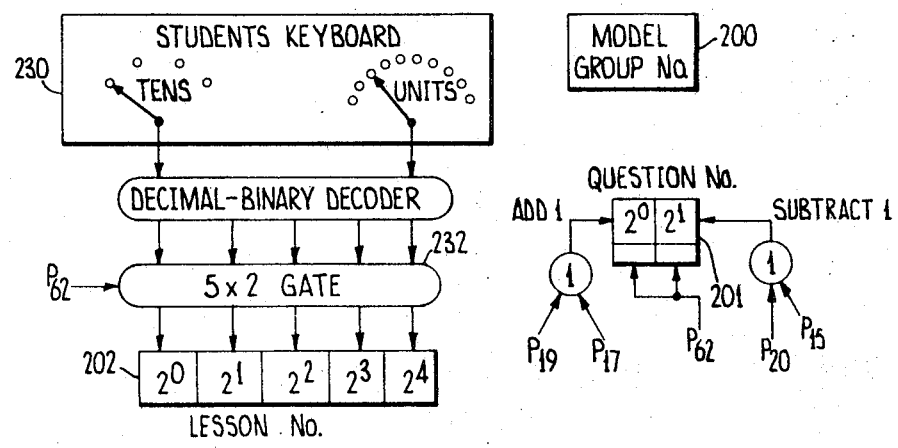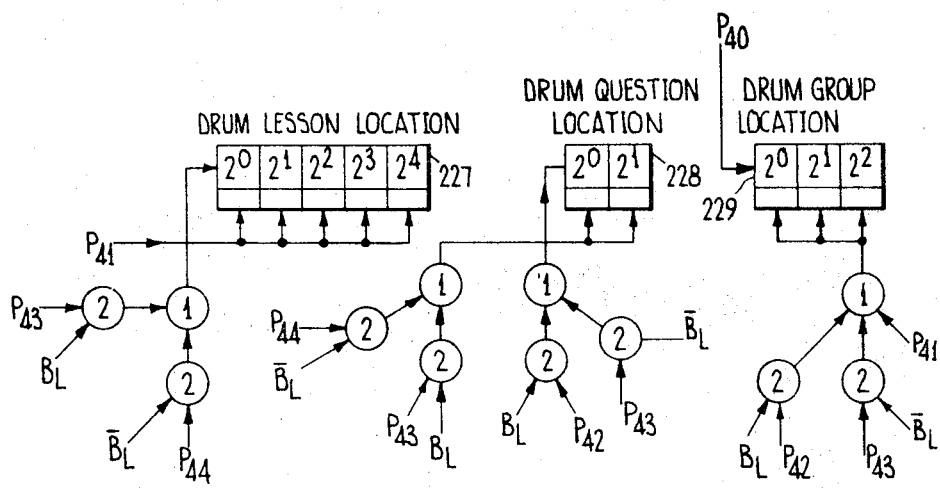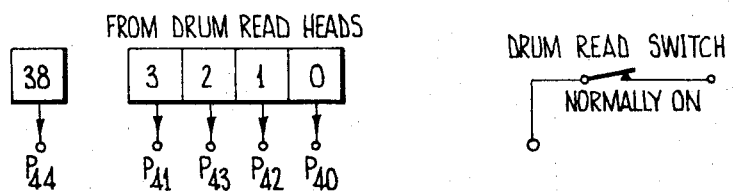
Fig. 13

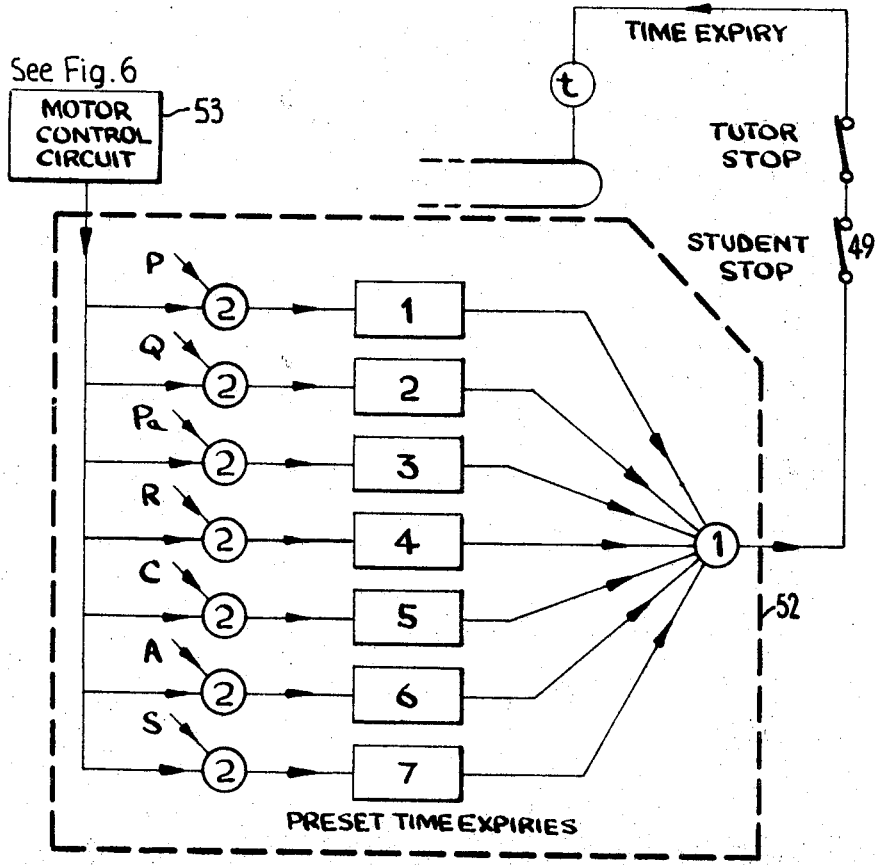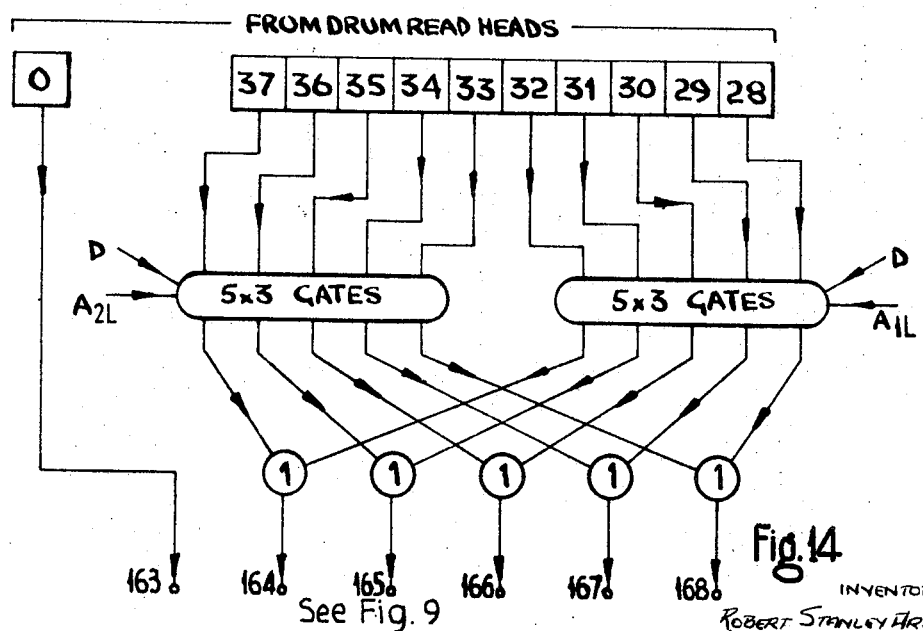
Fig. 14

United States Patent Office 3,528,181
Patented Sept. 15, 1970

3,528,181
TEACHING MACHINES
Robert Stanley Arbon, Rickmansworth, John Godolphin Bennett, Kingston-on-Thames, Colin Douglas Bright, London, and Anthony Malcolm Hodgson, Kingston-on-Thames, England, assignors, by direct and mesne assignments, to Structural Communication Systems Limited, London, England, a British company
Filed Jan. 25, 1967, Ser. No. 611,728
Claims priority, application Great Britain, Jan. 27, 1966, 3,696/66
Int. Cl. G09b 7/00
U.S. Cl. 35—9                8 Claims

ABSTRACT OF THE DISCLOSURE

A teaching machine having an array of response buttons which are identified with respective conceptual elements pertaining to a problem context and which the machine designates with a range of degrees of significance according to stored or inserted data, a range of corrective or confirmatory information displays being presented automatically in accordance with the particular selection of buttons operated by the student to constitute a response.

---

The present invention relates to teaching machines of the kind in which the information presented to the student is determined at least partly by the difficulty he has found in understanding previously presented information.

A disadvantage of previously proposed machines is the limited scope of the kind of question it has been possible to put to the student. In order to facilitate the assessment of the student's answer it has previously been a common practice to offer the student a choice of several plausible answers from which to choose the correct one. There has therefore been a tendency to condition the student to think in terms of cut and dried answers to every question thereby retarding the development of judgment, insight and creativity.

An object of the present invention is to provide a teaching machine which, while providing the ability to have answers automatically recorded and evaluated will at the same time provide a degree of flexibility and spontaneity nearer to that which characterises the essay or freely written answer.

According to the present invention, an automatic teaching machine adapted to teach a range of subjects comprises, in combination, information presentation means, response means and control means associated to control the information presented by said information presentation means, the response means having a plurality of manually operable elements, and means identifying said elements with items of information in respect of the subject to be taught a predetermined selection of which items constitutes a model answer to a question presented by said information presentation means, the control means having access to stored information as to the relevance of each said item to said model answer and controlling said information presentation means in dependence upon an assessment of the items selected by operation of said elements to constitute an answer.

The information stored in respect of each said item of information preferably comprises information as to whether the item is incompatible with the model answer, the control means including means responsive to the selection of any incompatible item to cause said presentation means to present appropriate remedial information.

The information stored in respect of each said item of information preferably comprises information as to whether the item is essential to the model answer, the control means including means responsive to the omission of an essential item to cause said presentation means to present appropriate remedial information.

The information stored in respect of each said item of information preferably comprises a weighting for the item indicating its degree of importance, if any, in the model answer, the control means including means responsive to the sum of the weightings of the items constituting the presented answer to cause said presentation means to present information appropriate to said sum in relation to a predetermined value.

In a preferred form of the machine, the information accessible to the control means defines, as a model answer, operation of predetermined selections each of one or more of said elements, the selections being in a predetermined order, said stored information indicating the relevance of any selection and the proper order of its presentation, the control means including means to control the presentation of further information in dependence upon the overall merit of the answer presented. In this case, the control means preferably has access to stored information in respect of each said selection indicating its correctness and its position in the model answer, the presentation of further information being controlled in dependence upon the number of incorrect selections, the correct selections and the order of the selections.

Several models of teaching machine in accordance with the invention will now be described, by way of example, with reference to the accompanying drawings, of which:
FIGS. 1 to 9 illustrate the first model, FIGS. 10 to 17 illustrate the second model, and FIG. 18 illustrates the third model.

FIG. 1 is a perspective view of a machine as disposed in use;

FIG. 2 is an elevation of a display screen of the machine;

FIG. 3 is a chart showing the sequence of available information frames;

FIG. 4 shows part of a control data frame and a key to the data stored on the frame;

FIGS. 6, 7, 8 and 9 are diagrams of the control circuits of the machine;

FIGS. 11 to 16 are circuit diagrams for the second model;

Figure 5:
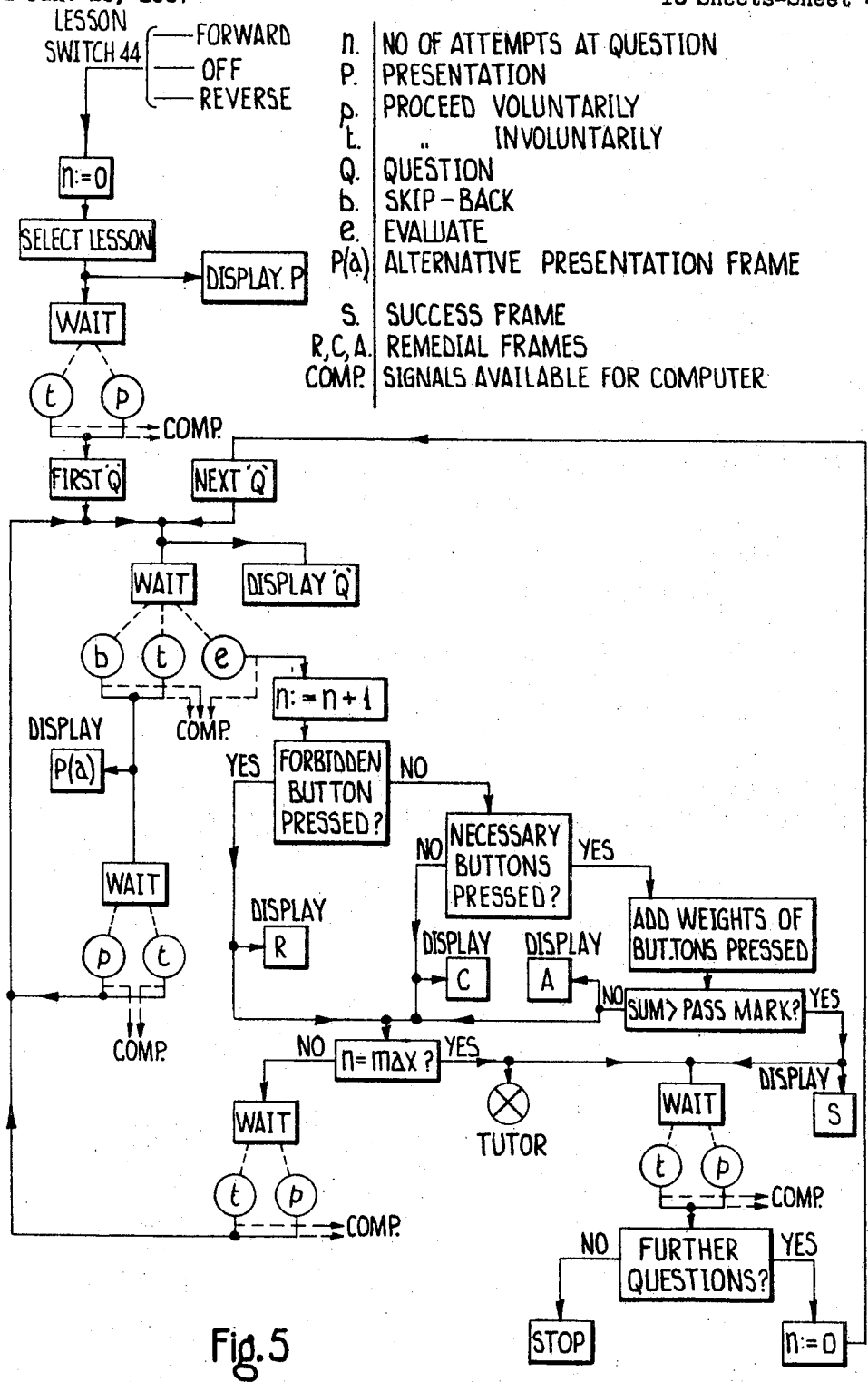
FIG. 5 is a flowchart indicating a students progress through a lesson.

Referring to FIG. 1 the machine is shown as a self-contained unit having a response unit 31 and a display unit 32. The display unit 32 also includes a control unit (which does not appear in FIG. 1) comprising logic circuitry controlling the machine in response to operation of the response unit and to data stored in the machine. The display unit 32 and response unit 31 are interconnected by a cable 33. As can be seen in FIG. 1 the cases of the response and display units 31 and 32 have complementary trapezoidal sections so that when not in use they can be fastened together by clasp fastenings to form a rectangular box which is easily stowed.

The display unit 32 is a random access projector using a microfiche transparency which is a 6″ x 4″ photographic transparency containing up to ninety separate frames arranged in a rectangular matrix. The fiche is mounted in a holder which is movable in two directions at right angles so that any frame can be located in a viewing position. The holder is driven by an electric motor which is controlled by start, stop and forward/reverse signals. Two sliding members correspond to X and Y axes of the fiche matrix. Attached to each sliding member are two rigid members between which the fiche is located, the two pairs of rigid members defining the rectangle of the fiche. When the motor is in motion the X axis is continuously scanned, the slide being driven by a can driven in turn by the motor through a friction cluch. This arrangement allows the motor to overrun when the slide is stopped suddenly. At the end of each sweep of the X axis a step by step motion causes the Y slide to advance by one step. Precise positioning of the fiche holder is obtained by an electromagnetically operated ratchet which engages in notches in the X and Y slides. Frame changes are effected at a rate of between five and ten per second.

The optical system includes a fifty watt quartz iodine lamp and projection by way of two mirrors to the screen 34 which is back etched. The screen provides a 13" x 8" display of any frame, the long edge being horizontal.

The control unit circuitry as shown in subsequent figures, is mounted on a printed circuit board within the display unit 32. Also within the display unit is a bank of photocells for reading data stored on the fiche.

Referring to FIG. 2 the screen 34 is shown displaying a frame of textual information laid out as two pages side by side. Above the screen is a progress indicator 35 which is an optional feature of the model giving a summary of the student's progress through a lesson.

The fiche is inserted and extracted by means of an aperture 36 access to which is only permitted when the fiche is in a central position attained by operation of a centering knob 37.

The response unit 31 contains two banks of answer buttons 43 numbered, in all, one to twenty, one bank on each side of the unit. In the centre portion between the banks is a flush mounted box of twenty compartments in each of which is a dial lamp which comes "on" when the corresponding button is operated. The compartments are closed by a tinted translucent screen over which is hinged a transparent cover 38. In order to identify the answer buttons 43 with the subject matter of a particular lesson a transparent card 39 containing an array of textual items relating to that lesson is inserted between the translucent screen and the cover 38. The items of information are thus aligned with corresponding compartments and are illuminated on operation of the associated buttons 43.

The twenty answer buttons 43 operate latching relays which may be mechanically or electromagnetically tripped.

In addition to the answer buttons 43, there are four control buttons available to the student. These are a "proceed" button $p$, a "skip-back" button $b$ and an "evaluate" button $e$. All of these are momentary action buttons, that is, they are active only while held down.

Finally there are two switches 44 and 49, comprising a three position switch 44 having a stable "off" position and stable "forward" and "reverse" positions which controls the fiche-driving motor and an on/off switch 49 which is normally "on" and in that condition allows a lesson to proceed.

Two indicator lamps 45 indicate to the student success and failure respectively.

The fiche contains the whole of the information required for a series of lessons in a particular subject. This information includes instructional questioning and remedial information. Referring to FIG. 3 a general frame sequence is shown for a particular lesson. The sequence is repeated a number of times according to the number of lessons but will in fact follow a serpentine path through the frame matrix on the fiche.

A particular presentation frame $P^i$ is shown for a lesson $i$. This is followed by question one of lesson $i$, that is, $Q_1^i$; a control data frame $CD_1^i$ an alternative presentation frame $P_1^i$ ($a$); a first remedial frame $R_1^i$ appropriate when incomprehension is indicated; a second remedial frame $C_1^i$ when confusion is indicated; a third remedial $A_1^i$ when achievement is less than satisfactory; and finally a success reinforcement frame $S_1^i$ giving confirming or consolidating information.

The group of frames for question one is followed by a group for question two and so on. A further presentation frame will then precede a further series of question groups.

The control data frame CD, mentioned above, stores binary data for analysis of an answer to the particular question and for control of the resulting information display.

FIG. 4 illustrates a data frame 46 aligned with a set of optical reading heads 47 by means of which the stored data is read off. The storage area of the data frame 46 is divided into six columns and twenty-two rows. Each rectangle so formed, or at least a part of it, is either wholly transparent or opaque so providing binary coded information. Each of the twenty-two rows commences with a trigger mark, labelled T in the figure which signifies alignment of the particular row and the reading heads 47 and initiates the resulting operation.

The first twenty rows correspond to the twenty answer buttons of the student's response unit. The second bit from the left, of each "button row," indicates whether the particular button is "forbidden" that is, whether the element of information selected by that button is incompatible with a model answer. The next bit indicates whether the particular button is necessary, that is, whether the absence of the associated item of information is incompatible with a model answer. The next three bits give a weighting to the particular item of information, the weighting ranging from plus three to minus four.

The twenty first row gives a pass mark for the question the five binary digits giving a "pass mark" limit of thirty one. This pass mark is inserted as a negative number so that on being added to the mark actually attained for the question the result will be positive or negative according to success or failure respectively. The digits appearing in row twenty-one are thus the complement of the pass mark plus one. Thus a pass mark of six (00110) would be entered as 11010, a pass mark of twenty seven as 00101.

The twenty-second row contains the number of attempts permitted for the particular question. This is limited, in the present example, to four as a maximum. This number is not in binary code but is simply signified by a marker appearing in one of the first four of the five code positions. The number is therefore represented by which of the four positions is occupied, in descending order as shown.

The data frame passes the optical reading heads 17, between the display of a question and the display of a subsequent remedial or success frame. Data read-out is inhibited except when specifically required. The data analysis is sufficiently rapid that the next display is determined before any frame has been displayed.

In addition to the textual information on a frame, every frame other than a data frame has an optical marker by means of which its type can be identified that is, whether it is a P, Q, P($a$), R, C, A or S frame. It can be seen from FIG. 4 that the width of the data is small compared to its length (6 x 22) so that the extra heads 48 necessary to identify the different frames are accommodated within the span of a frame. Eight different kinds of frame are required to be identified so that four reading heads 48 are necessary, the frame markers being binary coded.

A typical lesson will be described with reference to FIG. 5 at any stage of which only the buttons shown are operative.

Wherever the fiche happens to be positioned within the frame sequence, momentary operation of the forward/reverse switch 44 will run the fiche forward or backward to the next or preceding presentation frame P. Repeated operation of the forward/reverse switch in a reverse direction will run the fiche back to the first presentation frame (or any selected presentation frame).

Any operation of the switch 44 provides a single shot pulse to clear all binary elements not concerned in the selection of P frames. Reverse operation of the switch 44, such as may be required on starting a lesson, sets a P binary element ON, sets a "motor reverse" binary element ON and sets a "motor start" binary element ON. The fiche proceeds along a reverse path until the coincidence of the P marker on the P frame and the set state of the P binary enables an AND gate to reset the motor-start binary element so stopping the motor. The AND gate also provides a signal to enable operation of the response unit and to set a "number-of-attempts" counter to zero.

The position is then as shown in the upper left of FIG. 5. A presentation frame P is on display giving instructional information. A "wait" period, as shown adjoining the "display P" box, is in progress while the display is studied. Two courses are then open although having the same result. If the student does nothing, or spends an excessive time studying the P display, a switch is operated by a time delay circuit triggered by the display of the P frame. This is indicated by the ringed $t$ in the diagram. Alternatively, before the elapse of the time delay $t$, the student presses the proceed button $p$ on the response unit. In either case the result is a signal which resets the P binary element to OFF, sets a Q binary element ON, sets the "motor-forward" binary element ON and sets the "motor-start" binary element ON. Again the coincidence of the set state of the Q binary element and a signal from the Q frame identifier head stops the motor. As any Q frame initiates a signal from the identifier head the first question encountered stops the motor.

When the question frame Q is displayed, as indicated at the "display Q" box, a wait period is again initiated during which the student studies the question and attempts an answer.

The present model of the machine is adapted for the posing of questions which require for their answer an appreciation of a combination of elements of information given in the primary presentation. The card 39 consists of a set of items which collectively cover all the significant information presented in the lesson. The student is required to recognize the information relevant to the particular question and form his response by means of the response buttons. The evaluation of the response is effected by means of the data frame following each question.

Typical questions posed by the present model are the following:

THE CELLULAR WORLD

LESSON ONE                  FRAME 1(1).1
Question One

Life has certain characteristics which it has in common with most other material forms, and certain features which distinguish it from what we refer to as inert or "dead" matter. One of these characteristics, shown clearly in studying the living cell, is that life reveals its properties as a whole. A piece cut from a cell does not show the same properties as a whole living cell.

Study your response matrix and pick out some primary characteristics which describe the living cell as a whole.

When you have set up your answer press the proceed button

THE CELLULAR WORLD

LESSON ONE                  FRAME 1(1).2
Question Two

Certain features in common are observed in both viruses and cells. For instance, they both are able to multiply and both can be agents of disease in living organisms.

Study your response matrix and pick out some primary characteristics which best describe the virus as contrasted with the cell, and in common with the cell.

When you have set up your answer press the proceed button

The presentation material has not been shown, for reasons of brevity, but the complexity of questioning possible can be gauged from these examples. The associated card 39, identifying the response buttons with items of information follows:

INTRODUCTION TO THE LIVING CELL

Lesson One—The Cellular World—Response Matrix

| | | | |
|---|---|---|---|
| 1—Mechanical Support. | 2—Dynamic Complexity. | 3—Regulation of input and output. | 4—Heterogeneity. |
| 5—Retention of material. | 6—Less than minimum organization for life. | 7—Dependence upon other forms of life. | 8—Variety of Shape. |
| 9—Capacity to be agents of disease. | 10—Independence from other forms of life. | 11—Control of heredity. | 12—Self-reproduction. |
| 13—Homogeneity. | 14—Aided-reproduction. | 15—Simplicity. | 16—Basically spherical shape. |
| 17—Visibility to optical microscope. | 18—Continuation of structure and function. | 19—Minimum organization for life. | 20—Selective separation of substances. |

The control data frames for the above questions will contain the following information in binary form. In each rectangle the top number is that of the answer button the lower number is the weighting and the central letters F and N denote "forbidden" and "necessary" respectively.

INTRODUCTION TO THE LIVING CELL

Lesson One—The Cellular World—Control Data for Question One
Pass Mark=11—Number of permitted attempts=4

| | | | |
|---|---|---|---|
| 1, −1 | 2, N +3 | 3, −1 | 4, +2 |
| 5, −1 | 6, F | 7, −1 | 8, +1 |
| 9, +1 | 10, +1 | 11, −1 | 12, N +3 |
| 13, F | 14, F | 15, F | 16, −1 |
| 17, +1 | 18, −1 | 19, N +3 | 20, −1 |

Logical rules: (1) if F included then Frame R. (2) If N omitted then frame C. (3) If pass mark not achieved then frame A. If pass mark is achieved then (frame S).

INTRODUCTION TO THE LIVING CELL

Lesson One—The Cellular World—Control Data for Question Two
Pass Mark=10—Number of permitted attempts=4

| | | | |
|---|---|---|---|
| 1, −1 | 2, +1 | 3, −1 | 4, +1 |
| 5, −1 | 6, N+3 | 7, N+3 | 8, −1 |
| 9, +1 | 10, F | 11, −1 | 12, F |
| 13, −1 | 14, N+3 | 15, F | 16, −1 |
| 17, F | 18, −1 | 19, −1 | 20, −1 |

Logical Rules: (1) If F included then Frame R. (2) If N omitted then frame C. (3) If pass mark not achieved then frame A. If pass mark is achieved then (frame S).

After making his attempt, if the permitted time has not elapsed he then presses the evaluate button as instructed for the machine to assess his answer. If the permitted time has elapsed, or if the student feels he would like to review the basic information and has pressed the skip-back button b, the Q binary element is reset to OFF, a P(a) binary element is set to ON, the motor-forward binary element is set to ON and the motor-start binary element is set to ON. The fiche is driven forward along its frame sequence until a signal from the reading head for the P(a) frame marker coincides with the set state of the P(a) binary element and resets the motor-start binary elements to its OFF state.

The P(a) frame may repeat the original information of the P frame identically or from a different aspect or in a way particularly relevant to the question. Having studied the P(a) frame during a further delay period the student may proceed voluntarily by pressing the proceed button p or involuntarily by awaiting the lapse of the permitted time. In either case the P(a) binary element is reset to OFF, the Q, motor-reverse and motor-start binary elements are set to ON and the preceding question is re-displayed. The student is then in the same position as before but armed with more information. He may skip-back to P(a) frame via the b button, be presented with the P(a) frame on time lapse or attempt the question by way of the answer buttons and the evaluate button e.

Operation of the evaluate button e causes the Q binary element to be turned OFF, and an "evaluate" binary element E to be set ON. It also increases the number stored in the 'attempts counter' by one (the function $n:=n+1$). It also switches the motor on, forward, and enables the data evaluation as the rows of data pass by the reading heads 47 in FIG. 4. As each row passes the heads the data is assessed if the row corresponds to a pressed answer button.

As shown in FIG. 5 the first check that is made is whether any "forbidden" button was pressed, then whether all "necessary" buttons were pressed and finally whether the sum of the weightings is exceeded by the pass mark. For a failure in any of these respects there is an appropriate remedial frame R, C and A respectively. Each remedial frame is associated with a binary element and the individual failure causes setting of the associated binary element to the ON state. The three remedial frames occur in the order R, C, A in the frame sequence (as shown in FIG. 3) so that the order of precedence is also R, C, A, that is, the order in which the frame markers will coincide with the reading heads 48 and initiate a signal to stop the motor.

Operation of any of the three binary elements R, C and A effects a comparison of the number of attempts so far made at the question with the maximum permissible attempts. As shown, this comparison results either in the initiation of a waiting period, from which the student can return voluntarily (the p button) or otherwise (t) to a further attempt at the question, or, if no more attempts are permissible, in an alarm signal to the tutor. The alarm is initiated by a binary element which is set to an ON state by the comparison circuit. A further binary is also set to an ON state so switching of the "fail" indicator lamp on the response unit.

If all of the three criteria are satisfied the "$n_{max}$" comparison is not made and a "success" binary element S is set to an ON state. This in conjunction with an S frame marker stops the motor to display the S frame which my confirm or supplement the students understnding of the question.

As shown, a "wait" period is initiated on display of the S frame and it is noted that this same "wait" period can be initiated, with the tutor's permission, on a failure after maximum attempts at a question. A voluntary or involuntary termination of the wait period effects a check as to whether there are any more questions in the lesson. If not, the machine is halted, but if yes the "attempts" counter is reset to zero (the $n:=0$ function) and the next question frame is displayed. The "wait" period from which there are three outlets, b, t and e, is again initiated and the latter part of the chart is repeated.

The circuitry of the machine will now be described with reference to FIGS. 6, 7, 8, 9 and 10.

Figure 6:
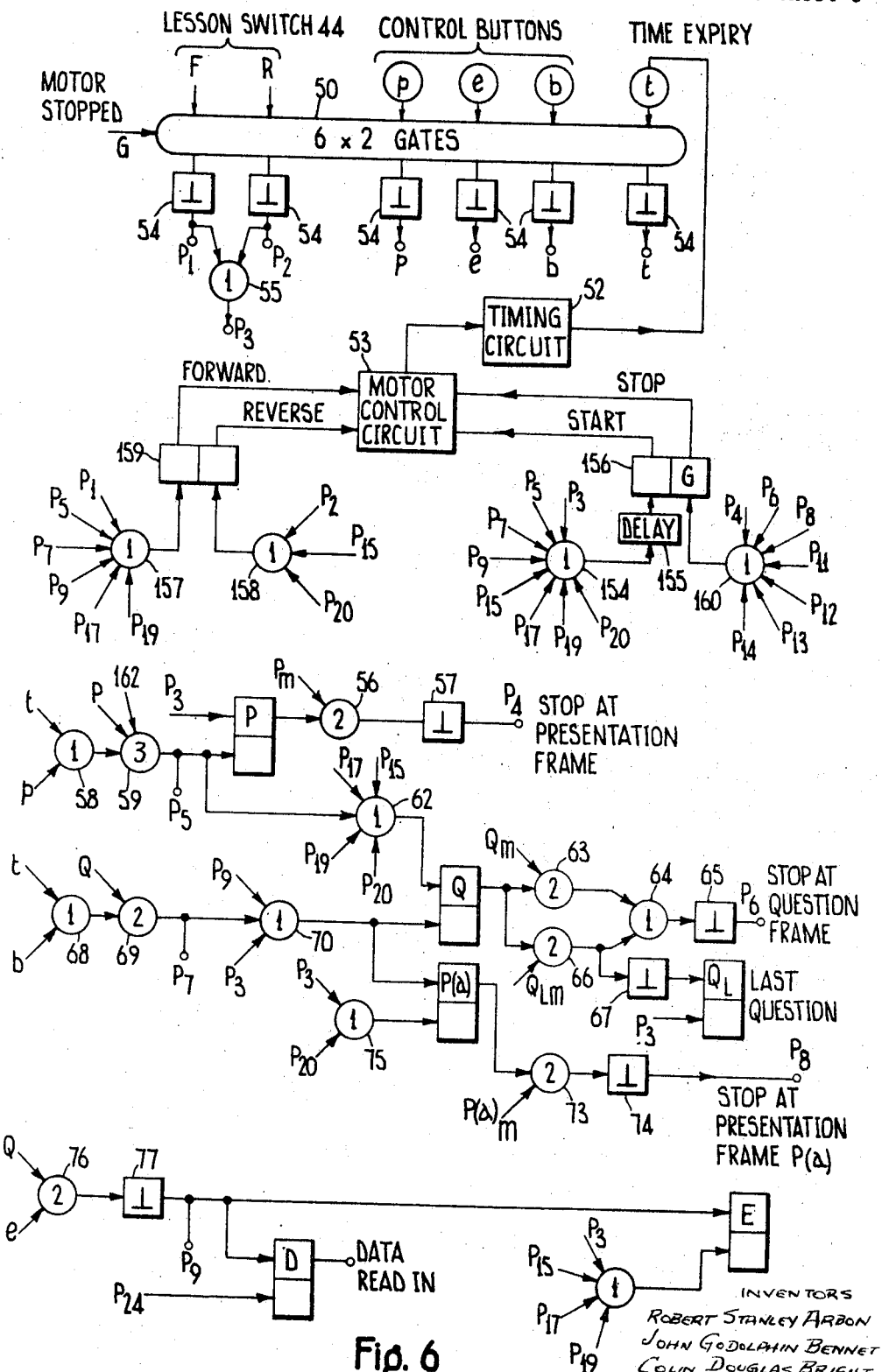

The operation of the machine requires the generation of a number of inter-related pulse signals. For this purpose a number of sub-circuits will first be described with reference to FIGS. 6, 7 and 8. Referring to FIG. 6, a multiple (6 x 2) AND-gate 50 has the following inputs. Input F is derived from the lesson-selecting-switch 44 previously referred to. When the switch is operated to its 'motor-forward' position a D.C. signal is applied to the input F. This D.C. level is represented by the binary digit "1." This is in common with all of the two-level signals appearing in the circuit, the presence of the signal being represented by "1" and the absence by "0."

The input R is similarly supplied with a "1" when the switch 44 is operated to its "motor-reverse" position.

The next three inputs are derived from the control buttons p, e and b of the response unit 31, each input having a "1" applied while the corresponding button is pressed. The remaining input t is derived from a timing circuit 52 which is triggered by a signal from the motor control circuitry 53. When the motor stops, a signal triggers the timing circuit 52 and after a predetermined time lapse a "1" is applied to the t input for a short time.

The input signals to the gate 50 are transmitted to their respective outputs independently but only in the presence of a "1" applied to the common input. This common input signal is derived from a motor start-stop binary element. When this binary element is set to the state shown containing the reference G, a signal supplied to the motor control circuit 53 stops the motor. This signal is also supplied to the common input of the gate 50 so that no output is derived from that gate unless the motor is stopped. The control buttons and switches are therefore inoperative while the motor and fiche are in motion.

Each output of the gate 50 is connected to a respective single-shot pulse generator 54. The output signals from the various generators 54 are referenced $P_1$, $P_2$, p, e, b and t in correspondence with the various input signals. As these output signals are used at many points throughout the circuit actual connections are not shown, in the interests of clarity. Instead, wherever one of these signals is required, the appropriate reference $P_1$, $P_2$, p, e, b or t is shown.

Figure 7:
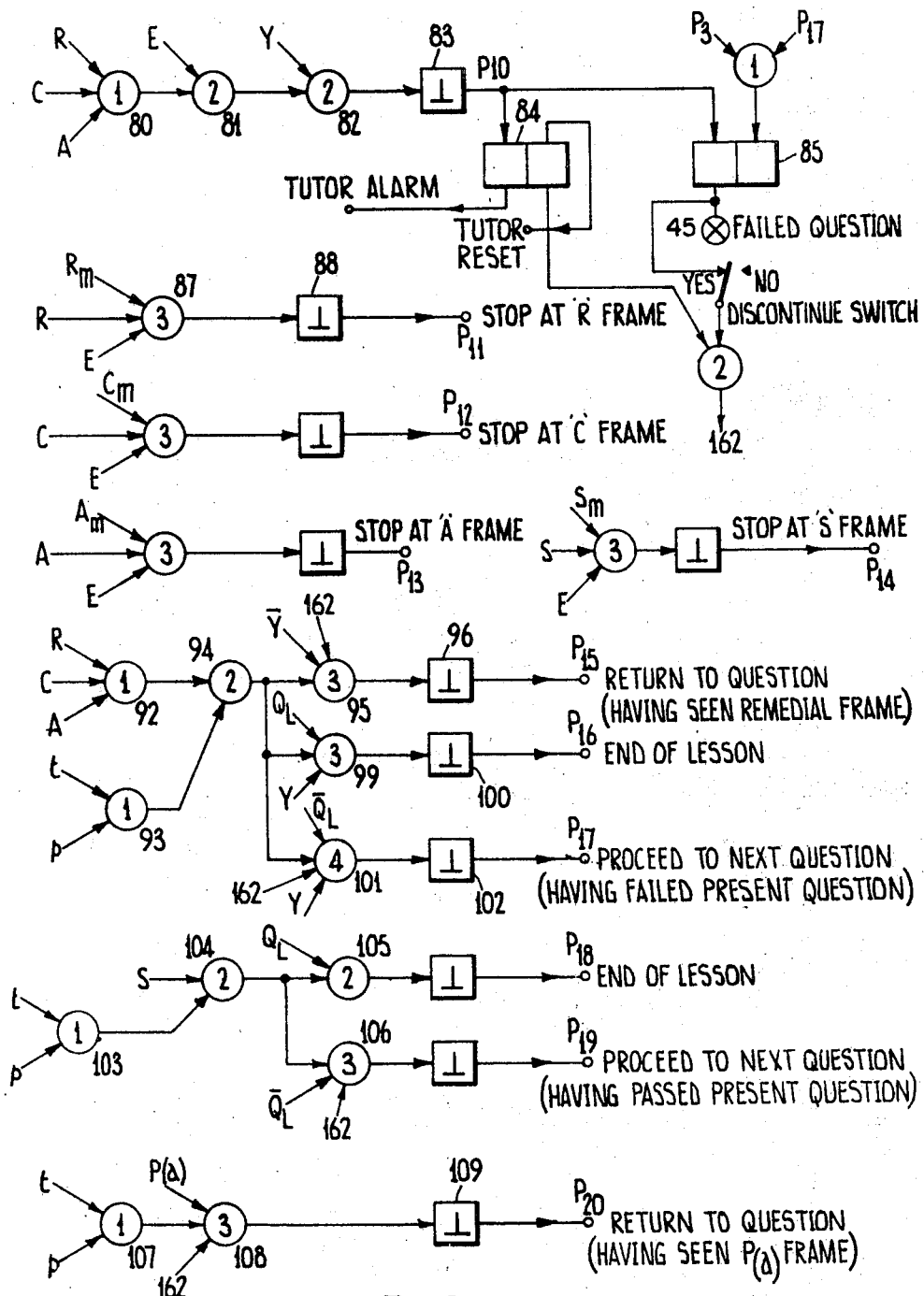

This applies similarly to the remainder of the generated pulse signals shown in FIGS. 6, 7 and 8.

A further pulse signal $P_3$ is derived from signals $P_1$ and $P_2$ by means of an OR-gate 55 to which $P_1$ and $P_2$ are applied.

The signal $P_3$ therefore provides a pulse at any operation of the switch 44 when the motor is stationary.

The pulse signal $P_3$ is applied to a binary element P the "P" being shown in the state which is ON when the binary enables a P frame display. A signal is derived from the "ON" state and applied to a two-input AND-gate 56, to the other input which is applied a signal $P_m$. The output of the AND-gate 56 provides a signal $P_4$ by way of a singl-shot pulse generator 57. The signal $P_m$ is derived from one of the frame identifier heads 48 shown in FIG. 9. This head responds only to the P frame markers. It can be seen therefore that a $P_4$ pulse is derived when the motor is in motion (resulting from a $P_3$ pulse) and a $P_m$ signal, resulting from recognition of a P frame marker by its identifier head, occurs.

The $P_4$ pulse is therefore suitable for stopping the motor at a presentation frame.

Figure 9:
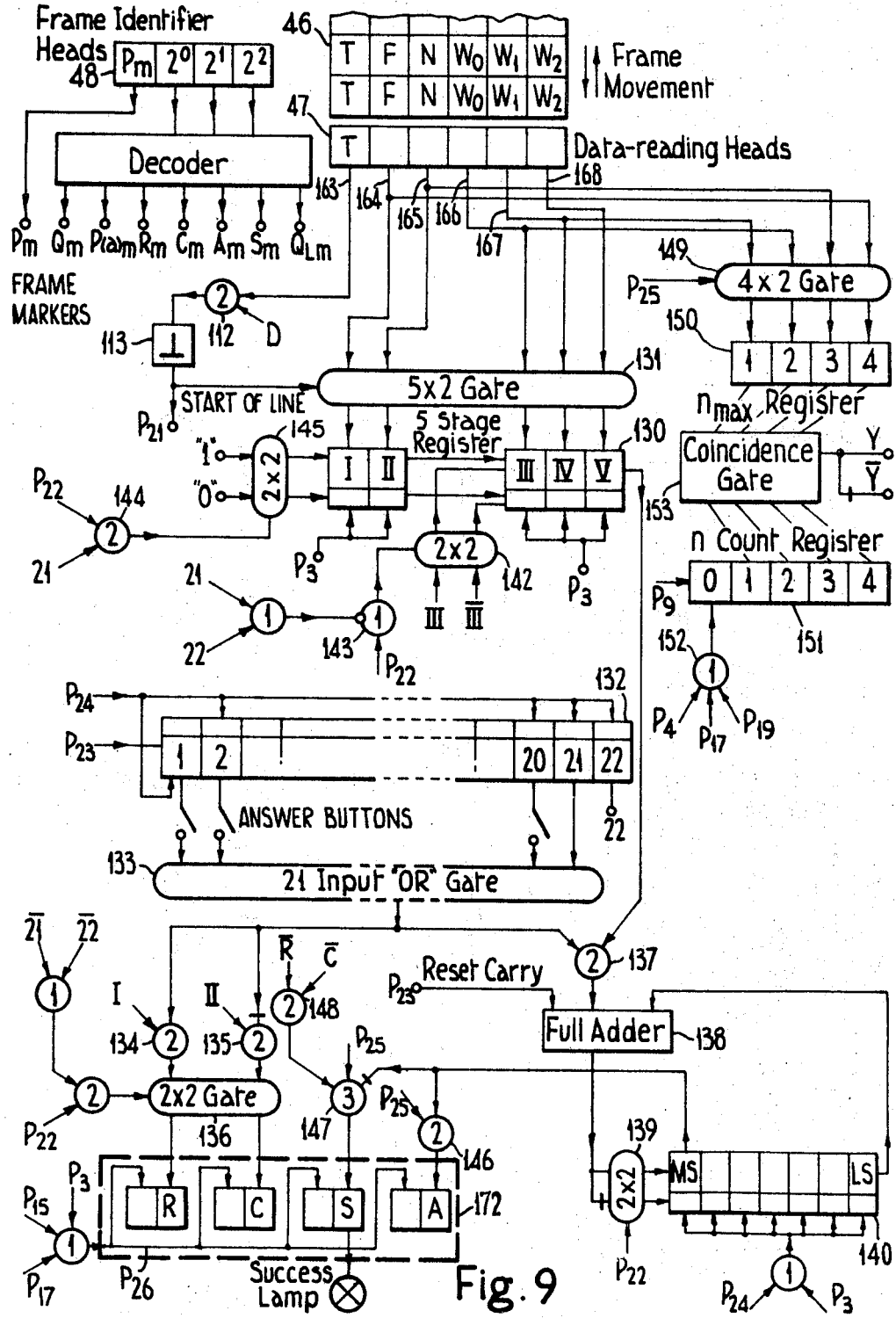

As shown in FIG. 9 the frame identifier heads 48 are displaced from the data reading heads 47. The heads 48 are automatically movable by the motor between two positions according to the motor direction, in both of which positions the frame markers are read before the frame is completely in its display position so permitting the motor some over-run after being switched off while the frame is accurately positioned.

The signals $p$ and $t$ are applied to an OR-gate 58 (FIG. 6) the output from which is applied to one input of a three-input AND-gate 59. A signal from the P binary element is applied to an other input of gate 59 and the output from this gate is used to reset the P binary element to its OFF state. The remaining signal 162 to gate 59 is derived (in FIG. 7) from the switch 49 and a "failure" binary 84 by way of a two input AND-gate.

The resetting signal from gate 59 is referenced $P_5$ and is seen to be derived by proceeding voluntarily or otherwise from a presentation frame.

The signal $P_5$ is applied to one input of an OR-gate 62 the output from which sets a question frame binary element Q to its ON state. The output of the Q binary element is applied to a two-input AND-gate 63, to the other input of which a Q-frame marker signal $Q_m$ is applied. Thus a $P_5$ pulse initiates progress from a presentation frame P and sets the Q binary element to its ON state. In this condition the marker signal $Q_m$ is effective to enable the gate 63 and produce an output signal $P_6$ by way of an OR-gate 64 and a pulse generator 65.

A $P_6$ pulse is therefore suitable for stopping the motor at a question frame.

The last question frame in a lesson is distinguished from the preceding questions by its own marker coding. The signal derived from recognition of a last question frame $Q_L$ is reference $Q_{Lm}$. To ensure that a $P_6$ pulse is available for every question frame including the last, an AND-gate 66 derives one input from the Q binary element, the $Q_{Lm}$ signal providing the other. The output of gate 66 is applied to another input of the OR-gate 64 from which the $P_6$ signal is derived.

To provide a signal peculiar to a last question frame the output from gate 66 is used to set, by way of a pulse generator 67, a last-question binary element $Q_L$.

The signals $b$ and $t$ are applied to the two inputs of an OR-gate 68 the output of which is applied to one input of a two input AND-gate 69. A signal from the Q binary element is applied to the other input of gate 69 the output of which constitutes a signal $P_7$.

Signal $P_7$ can be seen to be the signal derived by selecting "skip-back" or doing nothing when a question frame is displayed.

The signal $P_7$ is applied to one input of a three-input OR-gate 70 the output of which is used to reset the Q binary element and to set a $P(a)$ binary element to the ON state. An ON signal from this $P(a)$ binary element enables a two-input AND-gate 73, to the other input of which is applied a $P(a)_m$ signal from the frame identifier heads 48 when the alternative presentation frame $P(a)$ is recognised. The output from gate 73 is applied to a pulse generator 74 from which signal $P_8$ is derived.

Signal $P_8$ can be seen to be suitable for stopping the motor to display the alternative presentation frame $P(a)$.

The $P(a)$ binary element is reset by either a $P_3$ pulse or a $P_{20}$ pulse (to be derived subsequently) by way of an OR-gate 75.

The coincidence of an $e$ signal from the gate 50 and an ON signal from the Q binary element enables a two-input AND-gate 76 and provides signal $P_9$ by way of the pulse generator 77.

A signal $P_9$ pulse thus arises when the evaluate button $e$ is pressed during the display of a question frame.

A $P_9$ pulse is used to set an evaluate binary element E to the ON state and also to set a data-read-in binary element D to its ON state.

It will subsequently be explained how the assessment of a presented answer is made. A result of the assessment is that four binary elements R, C, A and S are selectively set to their ON states according as the assessment indicates incomprehension, confusion, insufficient achievement or success. When set to their ON states these binary elements provide corresponding signals R, C, A and S. The generation of further pulse signals using these R, C, A and S signals will now be described.

If the number of attempts made at a question equals the maximum permitted and at the same time no success has been achieved it is required that an alarm indication be given to the tutor. A signal Y indicating whether the maximum number of attempts has been reached is derived as will be subsequently described.

The presence of an R, C or A frame, i.e. a lack of success, provides a signal by way of OR-gate 80 to an AND-gate 81 the other input of which is derived from the evaluate binary element E. The output of gate 81 is applied to a two-input AND-gate 82 to the other input of which is applied the signal Y. The output signal of gate 82 is applied to a pulse generator 83 which provides a signal $P_{10}$.

A signal $P_{10}$ pulse can be seen to indicate failure of a question.

The $P_{10}$ signal is applied to binary elements 84 and 85, giving failure indications to the tutor and the student respectively. Binary element 84 is out of the students control and is reset by the tutor. Binary element 85 operates the failure lamp on the response unit 31.

The signal R together with the R frame marker $R_m$ and the evaluate binary ON-state signal E, are applied to the three inputs of an AND-gate 87. The output of this gate is applied to a pulse generator 88 from which a pulse signal $P_{11}$ is obtained.

It can be seen that the signal $P_{11}$ is suitably timed for stopping the motor when an R frame is recognised.

Signals $P_{12}$, $P_{13}$ and $P_{14}$ to stop the motor at the C, A and S frames respectively are derived in the same way as $P_{11}$. The evaluate binary indication E is applied to an AND-gate with the appropriate indication C, A or S and the corresponding frame marker signal $C_m$, $A_m$ or $S_m$.

When one of the remedial frames R, C or A is on display and the student, having studied the material, desires to make another attempt at the question, he presses the proceed button $p$ (or alternatively the $t$ signal appears). The necessary signal is generated by a three-input OR-gate 92 to which the R, C and A binary elements apply respective signals, in conjunction with a two-input OR-gate 93. The outputs of these two gates are applied to a two-input AND-gate 94 the output from which, in conjunction with the $\overline{Y}$ signal (indicating a number of attempts fewer than the maximum permissible), and the signal 162 indicating "no failure" or the tutor's permission for the lesson to proceed despite a "failure" enables a three-input AND-gate 95. The output from this gate is applied to a pulse generator 96 to produce a signal $P_{15}$ which effects a re-display of the current question.

It may happen that a remedial frame occurs in response to that permissible attempt at the last question $Q_2$ of a lesson. For this case a three-input AND-gate 99 has the following three inputs applied; the output of gate 94, the output of the last-question binary element $Q_L$ and the maximum attempts signal Y.

The output of this gate 99 is applied to pulse generator 100 from which a signal $P_{16}$ is obtained indicating the end of a lesson.

If a question prior to the last question in a lesson is failed after the maximum permissible attempts it is desirable that the student may proceed to the next question subject to the tutor's approval. The signal necessary for this purpose is derived from a four-input AND-gate 101 to the inputs of which are applied: the inverse signal $\overline{Q}_L$ from the $Q_L$ binary element, the output from gate 94, the maximum attempts signal Y and the "tutor permitting" signal 162. The output of gate 101 is applied to a pulse generator 102 from which a pulse signal $P_{17}$ is obtained.

A successful attempt at a question may terminate the lesson or initiate the next question. The necessary signals are derived as follows. An OR-gate 103 applies signals $t$ or $p$ to one input of a two-input AND-gate 104, a signal from the S binary element being applied to the other input. The output of this gate 104 is applied to one input of each of two AND-gates 105, 106, the other inputs being signals from the two states, $Q_L$ and $\overline{Q_L}$ of the $Q_L$ binary element, and additionally, in the case of AND-gate 106, the "tutor permitting" signal 162. The outputs from gates 105 and 106 provide signals $P_{18}$ and $P_{19}$ respectively, determining the end of the lesson and the presentation of the next question frame Q respectively.

When an alternative presentation frame P(a) is displayed and a return to the question is desired, the p or t signals are applied through an OR-gate 107 to one input of a three-input AND-gate 108. A signal from the P(a) binary element is applied to the other input and the output provides, by way of a pulse generator 109, a signal $P_{20}$.

Referring now to FIGS. 8 and 9, the derivation of the remaining pulse signals used in the operation of the machine will be described.

As previously mentioned, each row of the data on the data frame CD (referenced 46) commences with a trigger marker referenced T. When any one of these T markers is aligned with the T reading head a trigger signal is generated and applied to a two-input AND-gate 112. To the other input of this gate is applied a signal from the D binary element which, it is recalled, is set ON by pressing the evaluate button e while a question frame Q is displayed. The output of gate 112 is applied to a pulse generator 113 from which a signal $P_{21}$ is obtained.

On pressing the evaluate button e while a Q frame is displayed, therefore, a $P_{21}$ pulse is produced every time a T marker passes the T reading head. The $P_{21}$ signal is shown in FIG. 8.

A blocking oscillator 119, shown in FIG. 8, includes a feedback path by way of gate 115. The gate 115 is enabled by a binary element 116 when a $P_{21}$ pulse is applied to the binary element. The output from an AND-gate 117 is applied to the binary element 116 to reset it. One input signal to the gate 117 is the output signal from the blocking oscillator 119, this output signal being referenced $P_{22}$ (waveform shown in FIG. 8). The enabling input to the gate 117 is derived from a cyclic counter 118 which gives an output from the "6 stage" on a count of six input pulses. $P_{22}$ also constitutes the input signal to the counter 118. The operation of this circuit is as follows. When the binary element 116 is set "ON" by a $P_{21}$ pulse the oscillator 119 is repeatedly triggered (the frequency being determined by the oscillator circuitry) and produces a train of pulses constituting the signal $P_{22}$. The counter produces an output on a count of six and, at the next $P_{22}$ pulse, the binary element 116 is re-set to OFF. The oscillator 119 is then inhibited until the binary element 116 is next set ON by a $P_{21}$ pulse. Thus repeated trains each of seven pulses are produced each train being initiated by a $P_{21}$ pulse.

The output of the AND-gate 117 is applied to a pulse generator 114 from which a signal $P_{23}$ is obtained, this being a pulse aligned with the last pulse in each train of seven.

The $P_{23}$ pulse for data row 22 is referenced $P_{24}$ and is selected by means of an AND-gate 122 to which signal $P_{23}$ is applied and also a signal referenced 22 from a register yet to be described which selects the data row. A $P_{24}$ pulse can be seen to determine the end of a data frame evaluation.

Finally a pulse signal $P_{25}$ is derived from the $P_{21}$ pulse of data row 22. These two signals are applied to an AND-gate 124 the output of which is applied to a pulse generator 125 to give the signal $P_{25}$.

Referring now to FIG. 9 the evaluation of a presented answer and the consequent control of information displayed will now be considered.

The data frame 46 (shown more completely in FIG. 4) moves past the data reading heads 47 so that the twenty-two rows are scanned in numerical order. As the frames move at from five to ten frames per second, each row is aligned with the reading heads 47 for a very short time.

For each row, the five coded bits are read into a five-stage register 130 under the control of a five-by-two AND-gate 131. This gate is enabled by $P_{21}$ pulses so that as each data row is encountered by the reading heads 47, the data is read into the register 130. Gate 131 is controlled by the D binary element by way of gate 112 so that the data is read only as a result of an evaluation "request."

The first two stages of register 130, that is, stages I and II, store the "forbidden" and "necessary" characteristics respectively of each answer button as the data is scanned. For any button that has been operated this information is used to operate corresponding R and C binary elements which, when set, are used to select or indicate the remedial frames R and C.

The last three stages, that is, stages III, IV and V of register 130 store the binary coding of the weighting of each of the twenty buttons as the data rows are scanned. For any answer button that has been operated this weighting is accumulated to provide the sum of the weightings of the items presented as an answer.

The selection of the information in respect of only those buttons which constitute the presented answer is effected as follows. A twenty-two stage register 132 has a "1" inserted in the first stage and a "0" in every other by a $P_{24}$ pulse, which occurs at the end of every evaluation of the data. Signal $P_{23}$ is used as a stepping input, that is, the "1" is shifted along one stage at the end of the evaluation of each data row. The normal state of each of the first twenty stages of register 132 is connected to a respective input of a twenty-one input OR-gate 133 by way of one of the twenty answer buttons of the response unit 31. The twenty-first stage is permanently connected to one input of the OR-gate 133. The twenty-second stage is not connected to the OR-gate 133 but is used to provide a signal, referenced 22, at various points in the circuit such as in the derivation of pulse signals $P_{24}$ and $P_{25}$. At the end of each row evaluation the "1" digit is stepped along register 132 thus providing sequential outputs from gate 133 corresponding to those buttons which are pressed. As the "1" rests in any stage at which a button has been pressed the data corresponding to that button and stage is evaluated. The "1" then moves on to the next stage.

AND-gates 134 and 135 are enabled respectively by answer buttons that have and have not been pressed. The other inputs to gates 134 and 135 are the contents of stages I and II, respectively, of register 130. If stage I contains a "1" the button is "forbidden" and if it has been pressed an output is obtained from gate 134. If stage II contains a "1" and the button has not been pressed an output is obtained from gate 135. The respective binary elements R and C are set ON by these outputs by way of a double AND-gate 136. This gate has a common enabling input derived from the seven-pulse train $P_{22}$ in coincidence with the absence of a "1" from stages 21 and 22 of register 132. The binary elements R and C can therefore be set ON only by the evaluation of data in the first twenty rows.

With regard to the assessment of the total weighting of the presented answer the operation is as follows. The individual weighting of each button (whether pressed or not) is read into stages III, IV and V of register 130 through gate 131 at each $P_{21}$ pulse. If the particular button was pressed, an output is obtained from gate 133 to enable the AND-gate 137. The contents of stages III, IV and V are then stepped serially into an adder 138 through gate 137. The stepping signals are provided by the states of stage III by way of a double AND-gate 142. When enabled, gate 142 re-inserts the digits of stage III as the "resident" digit is shifted along to stage IV. Gate 142 is enabled by the train of pulses of signal $P_{22}$ through gate 143 unless inhibited by the presence of "1"s" in stages 21 or 22 of register 132. Thus for each data row evaluation the three weighting digits are read into stages III, IV and V by a $P_{21}$ pulse and then shifted out of regiser 130 by seven $P_{22}$ pulses serially.

Because of the "replenishing" effect of gate 142, seven digits are read out of register 130 into adder 138, the last four digits being identical to the preceding digit. As has been mentioned, the weighting range is from minus four to plus three. To change the three-digit weighting to a seven-digit weighting the three digits must be preceded by four "0"s or four "1"s according as the weighting is positive or negative. The binary equivalents of the weighting range are given as follows:

| | |
|---|---|
| +3=011 | −4=100 |
| +2=010 | −3=101 |
| +1=001 | −2=110 |
| 0=000 | −1=111 |

It can be seen that, for this range, if the most significant digit is "0" the weighting is positive and if "1" the weighting is negative. Therefore by "replenishing" with the most significant digit (Stage III) the weightings, both positive and negative, are converted to true seven-digit equivalents.

Accumulator 140 is set to zero by a $P_{25}$ pulse, that is, the $P_{21}$ pulse occurring on data row 22. As each digit is stepped into accumulator 140 the resident digits are shifted to the right. As each digit passes through the adder 138 it is added to the least significant digit of the register 140 by means of the "feedback" path. At the beginning of an evaluation, therefore, the seven-digit version of the weighting of the first pressed answer button is passed through the adder 138, a "0" being added to each digit (as the accumulator 140 is initially empty). At the next set of $P_{22}$ pulses for which an answer button has been pressed, the seven resident digits of register 140 are cycled back through the adder 135, the least significant resident digit being added to the first of the seven incoming digits and so on, the sum being re-entered into register 140. After scanning answer button twenty the sum of the weightings of all the pressed buttons will be stored in the register 140. This sum will be course have been increased by the positive weightings and decreased by the negative weightings.

At stage 21 of register 132 a permanent output from gate 133 is obtained, gate 137 thus being enabled.

The stepping input of Stage III of register 130 is now inhibited as the state 21 signal inhibits gate 143. However the state 21 signal enables the two-input AND-gate 144 so providing a common enabling input to the double AND-gate 145 and permitting the permanent inputs "1" and "0" to that gate to step the contents of all five stages. Stage II is connected to Stage III for this purpose.

On scanning data row 21 therefore, the input $P_{22}$ to gate 144 steps the five digits of Stages I to V into the adder 138 and makes the five digit number into a seven digit number by adding two "1"s at the most significant end. It has been stated that the pass mark is entered in data row 21 as a negative number, thus permitting the pass mark to be added to the total mark now stored in the register 140.

At the last of the $P_{22}$ pulses for row 21 the net total of mark attained + (−) passmark will be stored in register 140. All positive seven digit binary numbers from zero to sixty-three have a "0" as the most significant digit. All negative seven-digit binary numbers from minus one to minus sixty-four have a "1" as the most significant digit. The sign of the difference between the total marks attained and the pass mark can therefore be determined, for a range of difference from minus sixty-four to plus sixty-three, by examining the most significant digit of register 140. The range mentioned amply covers any ordinary weighting scheme.

The above fact is employed by enabling a two-input AND-gate 146 with a signal from the most significant stage of register 140. A $P_{25}$ pulse is applied to the other input. An output is therefore obtained from gate 146 when a "1" appears in the most significant stage of register 140, that is, when the passmark has not been reached. The output of gate 146 is used to set an "achievement" binary element A ON. An output signal from this binary element is used in indicating failure by way of gate 80 and in the derivation of signals $P_{13}$ (to select an A remedial frame) and $P_{15}$, $P_{16}$, $P_{17}$.

The most significant digit of register 140 is also used to inhibit (when it is a "1") a three-input AND-gate 147 the other inputs to which are the $P_{25}$ signal and the output of a two-input AND-gate 148 to which the off-normal signals from the R and C binary elements are applied. An output from gate 147 is therefore obtained only when a $P_{25}$ pulse occurs, the passmark has been reached, there is no R indication (no forbidden button has been pressed), and there is no C indication (all necessary buttons have been pressed).

The output from gate 147 is used to set a "success" binary element S ON, this S indication being used to derive $P_{14}$ (for stopping at an S frame) and $P_{18}$ and $P_{19}$ which determine the end of a lesson and the next question respectively.

Having now described the evaluation of the data in the first twent-one rows of a data frame the employment of the row twenty-two data will be described.

The five data reading heads 47 apply signals to respective inputs of a multiple AND-gate 149. A $P_{25}$ signal is applied to the common input of this gate, four output signals being derived in correspondence with the inputs when a $P_{25}$ pulse occurs. The four outputs of gate 149 are applied to the respective stages of a four-stage register 150. This register is such that each setting displaces the existing pattern.

In setting the permissible number of attempts at a question a single "1" is inserted in data row twenty-two in the position referenced 4, 3, 2 or 1 according as the permissible number of attempts is 4, 3, 2 or 1. On the occurrence of a $P_{25}$ pulse the gate 149 is enabled and the pattern is read into the corresponding stage of register 150. A five-stage register 151 has a stepping input $P_9$, which gives a pulse at every operation of the evaluate button $e$ in conjunction with a question display.

A resetting input to register 151 sets a "1" in the first stage (reference "0") only, this resetting input being derived from an OR-gate 152. The inputs to this OR-gate are the signals $P_4$, $P_{17}$ and $P_{19}$ so that the register 151 is reset at the beginning of a lesson and on proceeding to a new question. At each attempt at a question a "1" is stepped from the 0 to the 1 position and so on. A coincidence gate 153 is arranged to give an output when the stepped "1" of register 151 coincides with the stationary "1" of gate 150. This output is the signal Y which with its inverse $\overline{Y}$, is used to determine progress from a remedial frame in deriving signals $P_{15}$, $P_{16}$ and $P_{17}$.

Reverting now to FIG. 6, the display control is effected as follows. All conditions throughout a lesson in which the display is required to be changed are defined by the signals $P_3$, $P_5$, $P_7$, $P_9$, $P_{15}$, $P_{17}$, $P_{19}$ and $P_{20}$. These signals are therefore applied to an OR-gate 154 the output of which is applied to a motor start/stop binary element 156. This binary element is connected to the motor control circuitry 53, the two states of the binary element 156 switching the motor on and off respectively.

All conditions throughout a lesson in which the frame display is required to be moved forward along the sequence of FIG. 3 are defined by the signals $P_1$, $P_5$, $P_7$, $P_9$, $P_{17}$ and $P_{19}$ and conversely, for a reverse movement, by signals $P_2$, $P_{15}$ and $P_{20}$. The first of these groups is applied to an OR-gate 157 and the second to an OR-gate 158. The outputs of the two OR-gates are applied to a direction binary element 159 to set the two states respectively. The binary element output is applied to the motor control circuitry 53 so that, in conjunction with the start/stop binary element 156 the motor is always started at the required time and in the required direction.

The signals $P_4$, $P_6$, $P_8$, $P_{11}$, $P_{12}$, $P_{13}$ and $P_{14}$ are each derived from the coincidence of an ON state of a respective binary element and the recognition by the frame identifier heads 48 of the corresponding frame marker. The seven kinds of frames appearing in the sequence of FIG. 3 correspond to these seven pulse signals so that a particular frame can be selected by stopping the motor with the corresponding signal. These seven signals are therefore applied to a seven-input OR-gate 160 the output of which resets the start/stop binary element 156.

In an alternative system for selecting subsequent frames, frame markers are not used, except on the presentation frame P and question frame Q the motor being switched off by an adjustable stop which is positioned in one of five positions corresponding to the positions of five frames to be selected. Each of the five positions has an associated solenoid which when operated moves the adjustable stop to its predetermined position. The P(a), R, C, A & S frames may be selected in this way.

In a modification, indicator lamps may be provided for registers 150 and 151 to indicate to the student the number of attempts he is to be allowed and how many he has already made.

From the analysis of the control circuitry given for this model it will be apparent that a computer can conveniently be programmed to perform the various logic operations.

When the machine is on-line to a data-processing system the following information is transferred from the control unit to the data processor;
(1) Identification of student, topic and lesson.
(2) The number of attempts the student makes at each question.
(3) The response the student makes to each question.
(4) The weightings specified by the educational programmer.
(5) The time taken by the student on each frame.

The data processor can help the educational programmer to develop new programs by analysing the performance of a sample group of students. It can also help to automate the educational process by maintaining a record for each student and controlling the educational program in accordance either with the tutor's instructions or automatically from its records of the student's past performance. Control of the program may be exercised as follows:
(a) By modifying the thresholds set by the educational programmer.
(b) By specifying the maximum length of time the student is allowed for each frame.
(c) By specifying the number of questions which may be failed in any lesson.

The second model of teaching machine embodying the invention will now be described.

An essential difference between this model and the preceding one is the facility of the second model for posing questions to which the answer is of a sequential nature, that is, it comprises a number of parts each of which may comprise a number of information items the parts having a correct and an incorrect sequence of presentation. For the purpose of this description each such part will be called a group (of information items) the items of each group being selected from an array of information items disposed on a card as for the first model. Each answer button again identifies a respective item of the array.

The model B, as it will be called, has all the facilities of the first motel, that is Model A, and can therefore pose combinational questions and evaluate the answers. In addition, however, for a "sequential" question it is adapted to check whether each group of the presented answer is correct or not, check the importance of any correct groups of the presented answer and check the degree of order of those groups. Remedial frames are then displayed according to whether any of these tests has found the presented answer unsatisfactory.

Each group of a "sequential" answer may comprise several of the response items. Such groups have therefore to be "entered" separately on the response unit. A group button $a$ is provided, in addition to those for Model A, so that after a group has been set up, the $a$ button is pressed and the group is entered as a whole.

Figure 10:
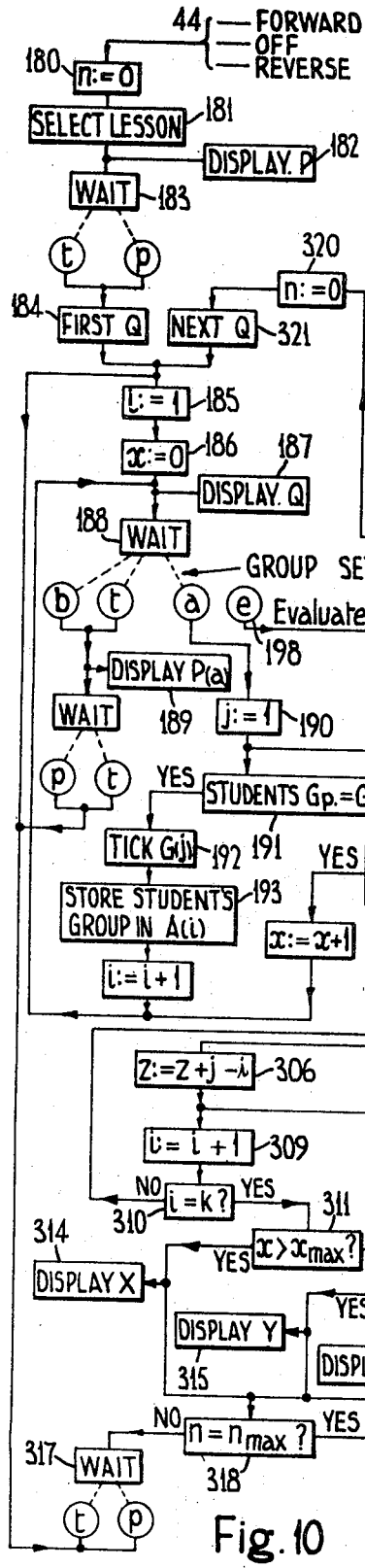
FIG. 10 is a flow chart showing the functional operation of the second model in relation to a student's progress through a lesson.

The flow chart of FIG. 10 shows the derivation of the above tests in a logical manner although the actual operations may be different in detail for practical reasons.

The switch 44 when operated sets a number of attempts counter to zero (180) selecting a particular lesson in the process (181). An instructional presentation is displayed (182) following which a "wait" period (183) occurs while the display P is studied. If the wait period elapses with no action by the student ($t$) or if he presses his "proceed" button $p$ a first question is initiated (184), an $i$ counter is set to "1" (185), an $x$ counter is set to zero (186) and the question is displayed (187). The "$i$" counter indicates a store location for correct groups of the student's answer while the $x$ counter indicates the number of wrong groups in the student's answer.

A wait period 188 is initiated during which the skip-back button $b$ may be operated to produce an alternative presentation display P($a$) 189 from which a return to the question frame (187) is effected. Display P($a$) will also be produced involuntarily if no action is taken (via $t$). The student may however set up a group during the period 188 by operation of a combination of the answer buttons. If so, he then presses the group button $a$ which sets a $j$ counter to "1" (190) thus "looking at" the first group in the stored model answer.

The student's group is thus compared with the first group of the model answer (191). If there is equivalence the model answer group is "ticked" and stored (192) and the student's (correct) group is stored in the location indicated by the $i$ count i.e. location 1 (193). The $i$ counter is then set to the-existing-$i$+1, that is "2" and a return is made to the group-set-up position. If there was no equivalence between the student's first group and the model answer first group the latter is checked to see if it was the last model answer group (194) which in this instance it is not. The $j$ counter is then set to the existing $j$+1 i.e. "2" (195) in order to examine the next model answer group. The student's first group is then compared with the second model answer group (191). If there is equivalence the next student's group is dealt with as before: if not the model answer group is checked to see whether it is the last group: if not the next model answer group is examined for equivalence, and so on. If there is no equivalence with any model answer group there will be an answer "no" to question 191 and eventually an answer "yes" to question 194. This results in the $x$ counter being stepped on by "1" to indicate one wrong group in the student's answer. All these checks are performed immediately on inserting a group and pressing the $a$ button.

All the student's groups are checked in this way resulting in a store of those groups of the model answer for which the student has provided an equivalent, a store of the equivalent student's groups in the order entered, and a count of the wrong groups ($x$). When the student has completed his group entries he presses the evaluate button $e$ (198). The number of attempts counter is stepped on by "1" (199), the sum of the weights (4) of the ticked model answer groups is derived (300) and the number of ticked groups $k$ is derived (301). The ticked model answer groups are indicated by the block 302.

The displacement error of the student's (correct) groups is determined as follows. A $z$ counter, indicating sum of displacement errors, is set to zero (303) and the student's first correct group is considered (303). The first model answer group to be considered is the second i.e. the one *next* to the corresponding one. This is because in looking for errors by finding equivalence between a student's group and a model group there can, by definition, be no error if the equivalence is between groups of the same number in their sequence. Thus the $j$ counter is set to $i+1$ (304), that is, 2, and equivalence is tested (305). If there is equivalence there is a displacement error of 1 which is entered in the $z$ counter (306). $z$ is in fact increased by $j-1$ which in this case is $i+1-1$, that is $i$, and $i$ is 1. If there was no equivalence at 305 the check is made as to whether the model group checked is the last of the ticked model groups (307). Of not, the next ticked model answer group is considered (308) for equivalence with the student's (same) correct group (305). If there is no equivalence this loop is circulated again each time checking whether the model group is the last (307), if not, looking at the next model group (308) and comparing again (305).

When the last model group has been checked the next correct student's group is considered (309). If this next group is not the last (310) the previous equivalence checks are repeated by way of 304 the student's group being first compared with the succeeding model group ($j$ being $i+1$). Each time that equivalence is found for a student's group the $z$ counter is stepped on by 1. If the student's group is the last one (310) no equivalence check is made. At this stage the $z$ counter stores the sum of all backward displacements of the student's groups.

Pass levels are set for each of the three criteria, $X_{max}$, $Y_{pass}$ and $Z_{max}$. Checks are made in that order (311, 312, 313) and remedial frames are displaced (the first failed test taking precedence) accordingly (314, 315, 316). If none of these tests has been failed a success frame (322) is displayed confirming or consolidating the student's understanding. This display initiates a "wait" period (323) from which any further questions are posed.

On the display of a remedial frame, a check is made as to whether the number of attempts made equals the maximum permitted (318). If yest the question has been finally failed and the tutor is warmen (319). Further questions if any may then be attempted.

If the number of attempts has not exceeded the max, after a wait period (317) to study the remedial information another attempt may be made at the question by way of blocks 185, 186 and 187.

If another question is attempted (321), after success or failure, the $n$ counter is set to zero (320).

The circuitry of present model B machine is shown in FIGS. 11 to 16. It can be seen that all the facilities of the model A are present in addition to the facilities described exclusively for model B. A choice of mode A or mode B operation is given by a switch (not shown) on the response unit.

Figure 17:
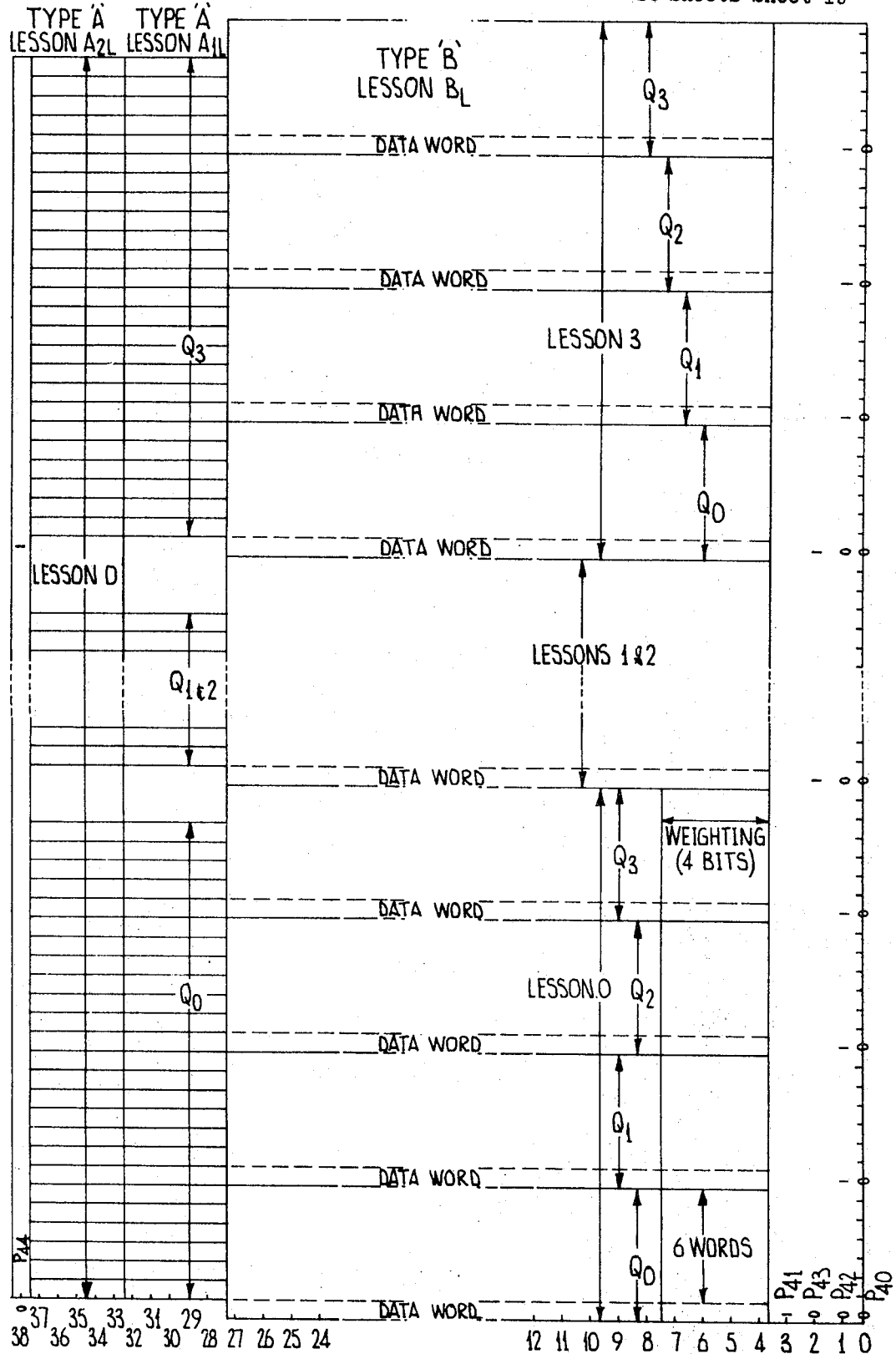
FIG. 17 is a data storage diagram for the second model showing the drum storage of data of two different kinds.

In this case none of the evaluation data, for A or B, is stored on the microfiche. However, a storage drum is provided, the layout of which is shown in FIG. 17. Thirty-nine reading heads are employed, five for timing tracks twenty-four for "sequential" or mode B lessons and five each for two kinds of "combinational" or mode A lessons. The educational programmer may then intermingle the two kinds of mode A lessons and the mode B lessons.

For the mode B lessons seven logic words are used for each question, the first of the seven being a data word giving information about the question, number of attempts permissible, number of groups in model answer (up to a maximum of six), and the criteria values, $X_{max}$, $Y_{pass}$, $Z_{max}$. The remaining six words are used to evaluate up to six groups sequentially, each of these 24 bit words giving a yes/no test for each of the 20 answer buttons in forming a group and the remaining four bits giving a weighting for the group.

The display is controlled as for model A, the motor being switched on forward or reverse and the coincidence of a signal derived from a frame marker and the ON state of an appropriate binary providing a motor stopping signal.

Referring to FIGS. 11 to 16 particularly, the operation is basically as follows.

In State P

Figure 11:
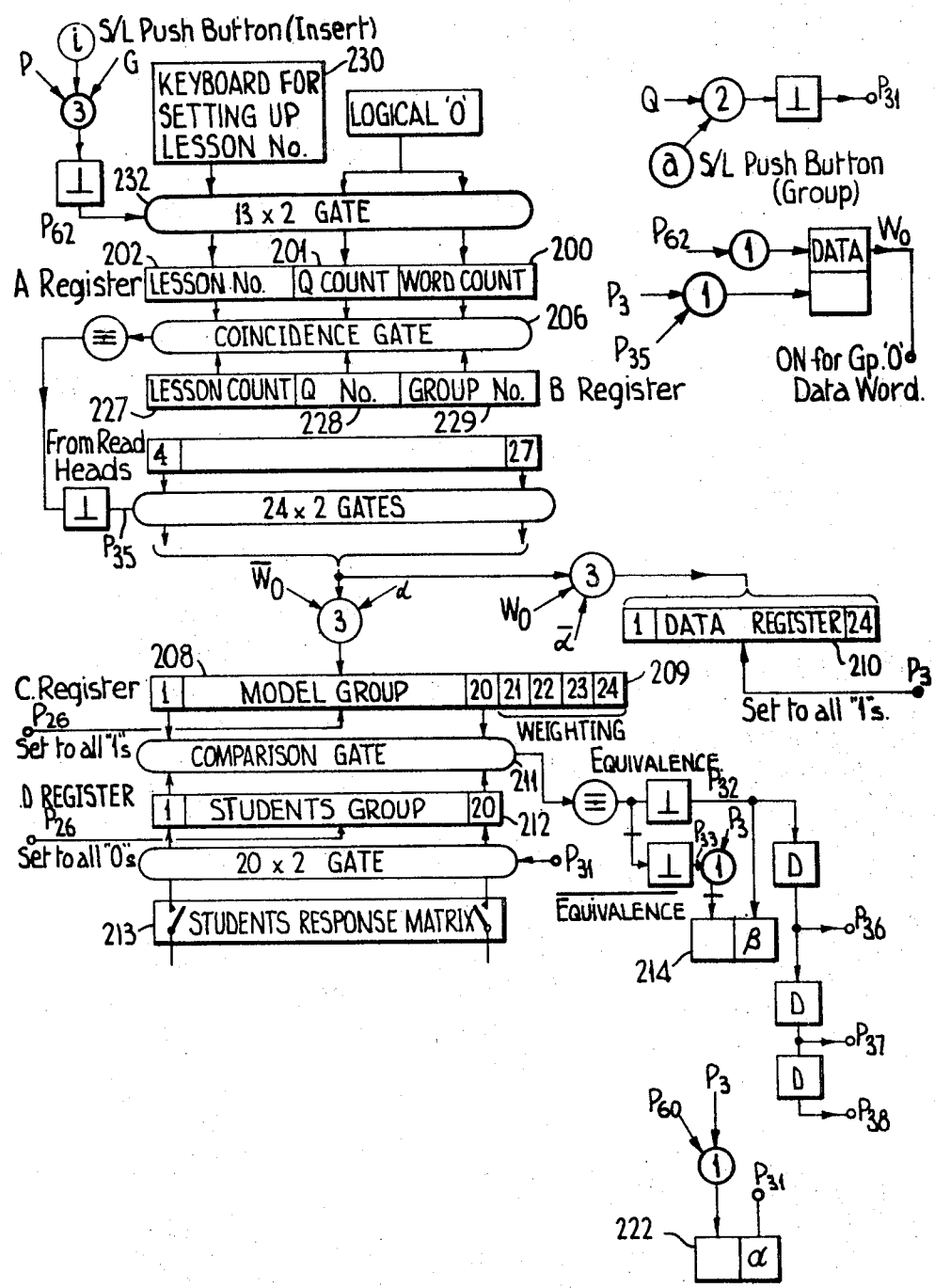

Switch 44 produces, as before, a presentation frame P which informs the student that he should set up the lesson number $n$, and type ($A_1$, $A_2$ or B) on the keyboard 230 (FIGS. 11 and 13) and the A/B switch previously mentioned, and then insert this information into his machine by momentarily operating a finish button marked "insert data" (FIG. 11). This action, in the presence of the presentation frame P and the motor "stop" binary (G) ON state, generates a pulse $P_{62}$. $P_{62}$ turns the DATA binary ON and inserts the lesson number and type into the A register. In addition the Q number and group number sections (201 and 200) of the A register are set to 0 and 0 respectively.

When coincidence occurs between the address in the A register and the drum location as given in the B register (the timing circuitry for which is shown in FIG. 13), a $P_{35}$ pulse is generated which transfers the initial control data (word 0) for question 1 of a B type lesson ($n$) into the DATA register (210). $P_{35}$ also turns off the DATA binary.

B type lesson State P: DATA binary OFF

Operation by way of $t$ or $p$ generates a pulse P5 (see FIG. 6) which turns P binary OFF, Q binary ON, motor forward binary ON, motor start binary ON.

$Q+Qm$ generate P5 to stop motor at Q frame. Operation of $e$, $b$, $a$ buttons produces no action.

In State Q

F/R produces a presentation frame and general resetting of the binary elements
(a) Operation of P produces no action
(b) Operation by way of $t$ or $b$ generates P7 which turns Q binary OFF, P$a$ binary ON, motor forward and motor start binaries ON. P$a$ and P$am$ generate P8 to stop motor at P$a$ frame.

With a P$a$ frame $t$ or $p$ generate P20 (see FIG. 7) which turns motor forward binary ON motor start binary ON and gives return to Q frame (P6 to stop motor).

Alternatively in state Q, student sets up his first group on the response unit. Momentary operation of group button $a$ generates P31 (see FIG. 11) which turns binary ON, and transfers student group into the student group register (D register).

When the drum next reaches coincidence (still at word 0) P35 (delayed, with $\alpha$ and $\beta$) produces P63 (FIG. 15) which sets the model group counter (200)-1.

On the next drum coincidence therefore, model group 1 will be read into register C. The model group counter cannot advance to a count of 2 immediately due to the delay between P35 and P63. It is during this period that the model group 1 in register C and student group 1 in register D are compared.

If no equivalence exists, then at the end of the delay period the model group counter will have advanced to a count of 2 and at the next drum coincidence model group 2 will be compared with student group 1. If no equivalence is found, student group 1 is compared with model group 3 etc. This process continues until model group 6 has been examined. At the end of the examination period a P60 pulse is generated (see FIG. 15) which resets the model group count to zero and switches the binary OFF. If equivalence was not found between student group 1 and model group 6, clearly the students group is incorrect and a pulse 64 is generated (see FIG. 15) which effectively subtracts 1 from the number of wrong groups permitted (as specified in the portion 218 of the DATA register 210).

When the student has entered the maximum permitted number of wrong groups ($x$ max), the contents of the counter of will be identical to zero. Detection of this state generates a pulse which sets a binary $X^1$. When the evaluate button is pressed (Q and $e$), P$q$ is generated and if $X^1$ binary is ON, P$q$ gives a noutput at X.

The α binary being OFF inhibits P63 pulses after the entry of a first wrong group, hence the model group count (200) remains in the zero count state until the student's second group is set up and he again operates the group button a. The resultant P31 pulse therefore transfers this group into register D and adds 1 to the student group counter giving it the value 2.

Consider this time that the student's group is a correct one and corresponds to model group number 5. The student group number will therefore be 2, the model group number will be 5 and on obtaining equivalence a P32 pulse will be generated (FIG. 11). The binary ON which inhibits P63 count pulses and hence stops the model group count at its present value 5.

The manner in which account is taken of this entry of a correct group and of its entry in an incorrect order, will now be described. Whereas the above test, for an excess of incorrect groups, may be designated the X test, the following two tests, for an adequate total of group weightings and for a minimum degree of order of the group entries, will be designated the Y and Z tests.

One portion 208 of the register C (FIG. 11) contains the model group and another portion 209 (shown more particularly in FIG. 12) contains the positive weighting or mark assigned to that group. Since the student has the same group in his answer he is credited with its value as follows.

$P_{36}$ (delayed equivalence pulse FIG. 12) transfers the weightings to the Y accumulator adder (initially set to zero at the beginning of each question). The accumulated total of credited weights is then transferred by $P_{37}$ (delayed equivalence pulse) to the Y parallel adder which adds these weights to the required pass mark ($Y_{pass}$) as specified in the portion 219 of the data register. $Y_{pass}$ is stored as a $-ve$ no. hence $-Y_{pass}+Y$ is performed.

When the evaluate button (e) is operated at the end of the sequence of group insertions, (Q and e) a pulse $P_9$ is generated. If at this time the overflow bit of the Y adder is $-ve$ this indicates that $Y Y_{pass}$ is negative and an output is given at y to indicate failure on this test.

Z test

Although the student has correctly identified a group he has entered it as his second group instead of, correctly, is fifth. In the B type of lesson it is required to assess the student answer in terms of the number of moves necessary to place the correct groups in the student's response in their correct sequence.

Consider first the answers symbollically and say that the model answer was in the order of entry

ABC+DEF+GHI+JKL+MNO+PQR and student's answer

PQR+ABC+DEF+GHI+JKL+MNO

By inspection PQR is displaced 5 places to the left. If we count moves to the left as $+ve$ and moves to the right as $-ve$ we have, considering every group in turn $+5-1-1-1-1-1=0$ and the sum of all the moves is zero. Hence in arriving at the number of steps necessary to put the correct groups in the student's response in the correct order only, say, positive moves need be counted.

Consider now in the above model and student sequences that we compare the group numbers which are stored in the model group counter (200) and student group counter (223) every time an equivalence is found.

Thus for the model sequence—

| | ABC | DEF | GHI | JKL | MNO | PQR |
|---|---|---|---|---|---|---|
| | 1 | 2 | 3 | 4 | 5 | 6 |
| | 2 | 3 | 4 | 5 | 6 | 1 |
| And subtracting | −1 | −1 | −1 | −1 | −1 | +5 |

Hence the answer is again $+5$ and the procedure is therefore that as each correct group is found we subtract the student group count from the model group count and add the difference if positive to an accumulator. At the end of the sequence in the example quoted we would therefore have the number $+5(=Z)$.

If we set a limit on the number of moves permissible for a satisfactory answer, $Z_{max}$, say 7, we must then perform the subtraction $7-5=+2$ and test whether the difference is $+ve$. If $-ve$ clearly the student has exceeded the moves permissible i.e. $Z>Z_{max}$ and the student has failed on this test.

Figure 12:
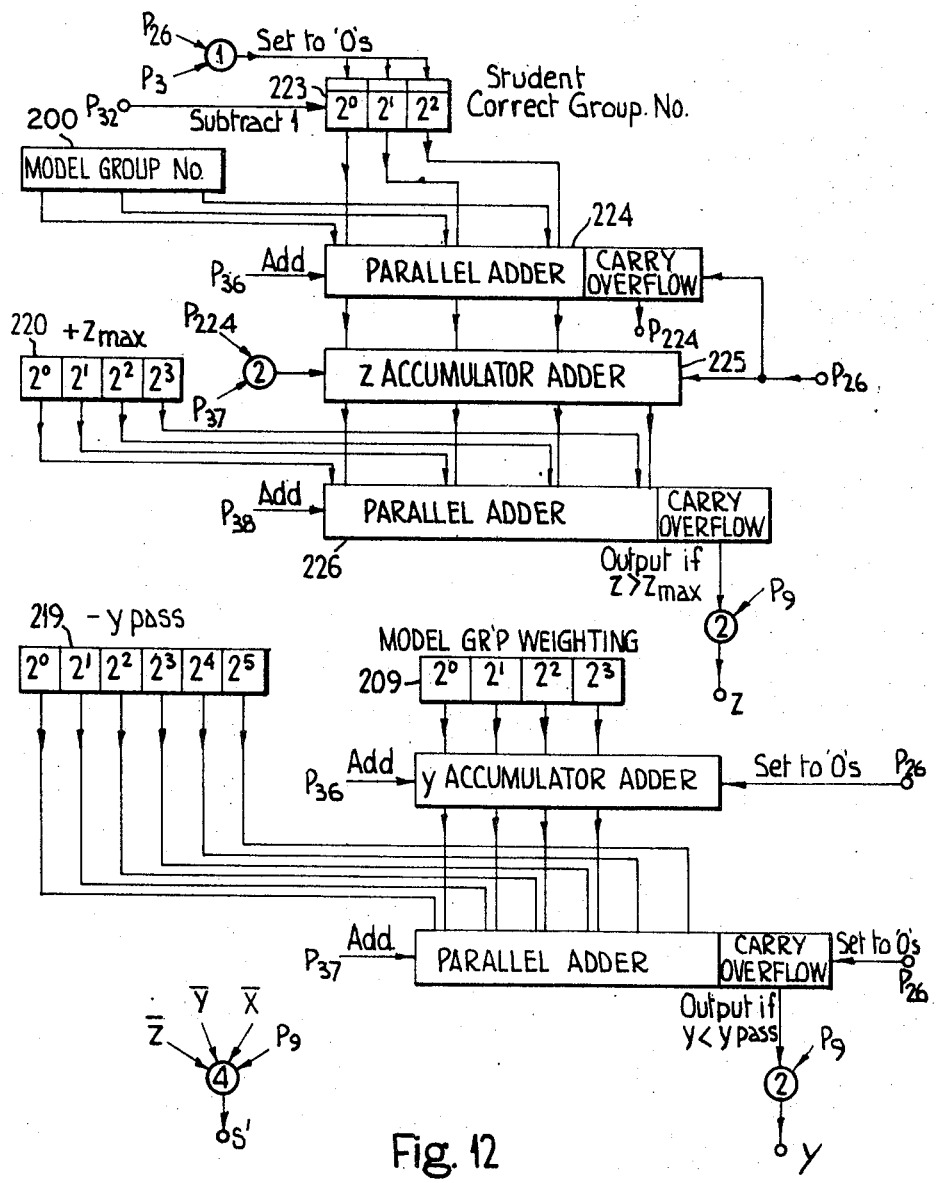

In practice the procedure is as follows using the same example and referring to FIG. 12, (1) The student correct group counter (223) (initially set to zero) counts in $-ve$ numbers (i.e. effectively subtracts 1 by $P_{32}$ each time a coincidence is obtained, and is reset to zero each time a $P_{26}$ pulse occurs (i.e. at the beginning of a lesson, return to a question, or proceeding to the next question).

(2) This $-ve$ number is then added to the $+ve$ model group number by $P_{36}$ (delayed equivalence pulse) i.e. for the example quoted

| | ABC + | DEF + | GHI + | JKL + | MNO + | PQR |
|---|---|---|---|---|---|---|
| Model group count No. | 1 | 2 | 3 | 4 | 5 | 6 |
| Student group count No. | −2 | −3 | −4 | −5 | −6 | −1 |
| Add | −1 | −1 | −1 | −1 | −1 | +5 |

(3) The $-ve$ numbers are added in the first Z parallel adder (224) giving the answer $-5$.

(4) The carry bit of the first Z parallel adder is inspected each time an equivalence occurs and if present (indicating a $-ve$ number) the contents of the first Z parallel adder are added by $P_{37}$ (delayed equivalence pulse) to the Z accumulator adder 225 (initially set to the all zero state at the beginning of each question).

(5) The accumulated $-ve$ number is then added by $P_{38}$ (delayed equivalence pulse) in the second Z parallel adder (226) to the $+ve$ value of $Z_{max}$ as specified in the portion 220 of the data register 210. For the example quoted the operation performed is $+7+(-5)=+2$. If during the sequence of operations the sum of moves necessary (Z) becomes greater than the total of moves permitted (Z maximum) (as specified in the data register) then the carry becomes negative. When the evaluate button is operated (Q,e) a pulse $P_9$ is generated. If the carry is negative $P_9$ gives an output at Z indicative of failure of this test.

The circuitry of FIGS. 11 to 16 is in general self evident but several special features will now be mentioned.

Figure 15:
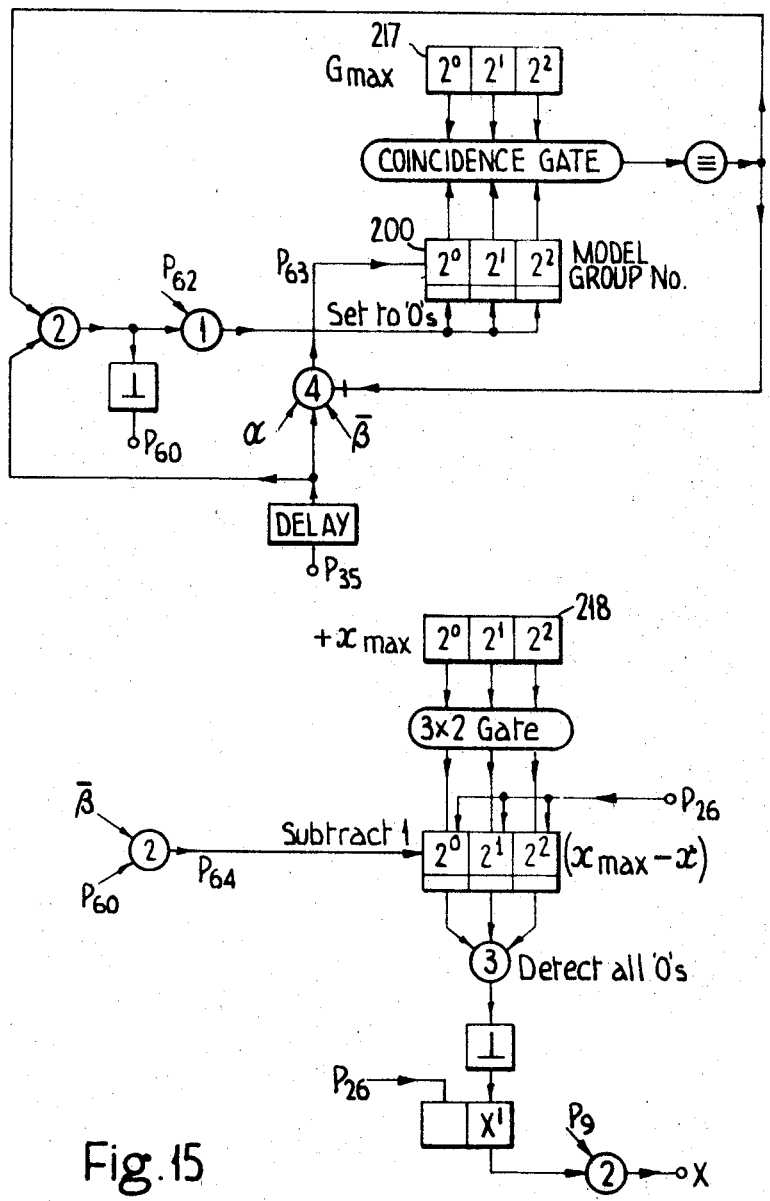

In FIG. 15 the upper circuit permits variation of the number of groups that may constitute a model answer. $G_{max}$ is inserted in the upper register 217 and coincidence between this count and that of counter 200 (the model group number) produces a pulse which inhibits the $P_{35}$ input to counter at whatever count the coincidence occurs and resets the model group counter to zero.

Figure 16:
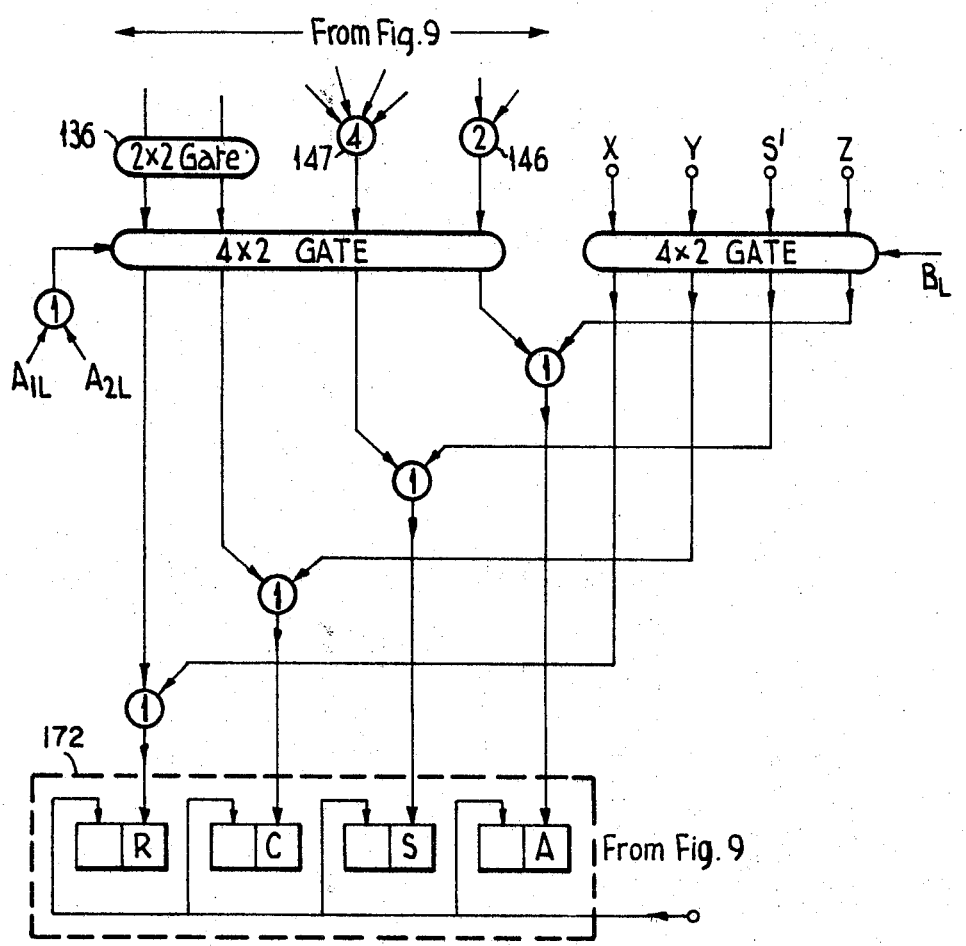

In FIG. 16 the indicator binaries R. C. S and A are shown doing duty for A1 or A2 type lessons (see FIG. 17) by way of gates 136, 146 and 147 and a multiple AND gate. This multiple AND-gate is followed by four OR gates having as alternative inputs signals from a multiple AND gate having B-type-lesson signal ($B_L$) as a common enabling signal. Thus the same binaries are used in both A type and B type lessons and are controlled by signals in accordance with the lesson type. They therefore indicate either R, C, A and S as defined for mode A operation or X, Y, Z and $S^1$ for mode B.

In both the A and B models the time expiry feature $t$ (appearing on the flowcharts 5 and 10 for example) has been mentioned as though it were fixed in all circumstances. This is not so however for regarding FIG. 14 there is a number of different time expiry units each initiated by the stopping of the display drive motor and the turning ON of a respective binary P, Q, Pa etc. Thus any display is maintained for a particular time dependent upon the type of display.

This arrangement also facilitates stopping the lesson at any time by student or tutor by way of the series toggle switches.

Clearly the model B machine lends itself to computer control in which case all the operations performed by the student and the machine can be recorded for subsequent use.

Figure 18:
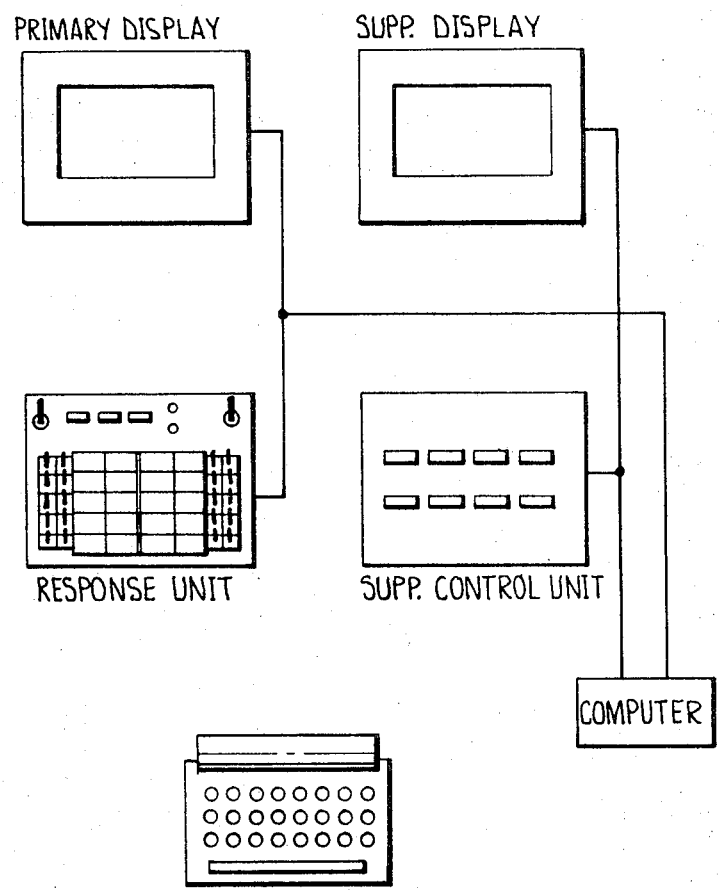
FIG. 18 is a schematic diagram of the component apparatus of the third model.

In an advanced modification of the machine, a model C (FIG. 18) a typewriter is employed for typing in an unrestricted answer and buttons are provided on the response unit for making a self assessment on the "essay" answer so provided. In this modification there are two display units, one of which carries a magazine having information and question frames of the previous types and in addition questions requiring unrestricted answers. Each frame of this latter type is grouped with a frame providing information which assists the student in assessing his answer and with a further frame providing a model solution. The second display unit contains reference information to assist the student during the construction of his answer. A control unit is provided to initiate the display of the intermediate information and of the model answer. On studying the model answer the student inserts an assessment of his own answer.

We claim:

1. In an automatic teaching machine the combination of,
    (a) information presentation means providing a plurality of information presentations selectively, said presentations including expository and problematic presentations which are interrelated phases of a common theme,
    (b) response means having a plurality of manually operable elements,
    (c) means identifying said manually operable elements individually with items of response information in respect of more than one related of said problematic presentations,
    (d) data storage means storing predetermined evaluation data in respect of more than one related problematic presentations, said evaluation data specifying as to the same items of information for plural problematic presentations in respect of each of said manually operable elements one of at least three degrees of significance, and
    (e) circuit means responsive to operation of said manually operable elements to control said information presentation means by presenting other than the previously presented expository problematic presentations in dependence upon the significance attributed by said evaluation data to the selected states of said manually operable elements.

2. A combination according to claim 1 and including timing means effective to replace an information presentation after a predetermined time.

3. A combination according to claim 1, wherein the information presentation means comprises a visual display apparatus including a random access film magazine.

4. A combination according to claim 1 wherein said means identifying said elements with items of response information comprise an array of textual items constituting said items of response information, replaceably superimposable on the response means.

5. A combination according to claim 4, wherein said array of textual items is disposed on a translucent card, the response means including means for illuminating a selected item when the associated manually operable element is operated.

6. In an automatic teaching machine the combination of,
    (a) information presentation means providing a plurality of information presentations selectively, said presentations including expository and problematic presentations,
    (b) response means having a plurality of manually operable elements,
    (c) means identifying said manually operable elements individually with items of information in respect of at least one of said information presentations.
    (d) the states of all the manually operable elements taken together constituting a response to a problem presented,
    (e) data storage means storing predetermined evaluation data in respect of each problem presentation, said data specifying, for a particular test in a response assessment, a set or combination of operable elements of equal significance in relation to that test, and the numerical proportion of that set which determines the outcome of said test, different values of said numerical proportion conferring different degrees of significance on said set of operable elements,
    (f) circuit means responsive both to signals produced in accordance with the response states of said manually operable elements and to data stored by said data storage means in respect of each problem to determine whether the numerical proportion specified in a particular test has been attained and to produce an appropriate presentation control signal, and
    (g) presentation control circuit means effective to determine a subsequent presentation in dependence upon said presentation control signal.

7. In an automatic teaching machine the combination of,
    (a) information presentation means providing a plurality of information presentations selectively, said presentations including expository and problematic presentations,
    (b) response means having a plurality of manually operable elements,
    (c) means identifying said manually operable elements individually with items of information in respect of at least one of said information presentations,
    (d) the states of all the manually operable elements taken together consistuting a response to a problem presented,
    (e) data storage means storing predetermined data in respect of each problem presentation, said data specifying in respect of each said manually operable element that the particular element is essential to a satisfactory response or that the particular element is incompatible with a satisfactory response, or specifying an alternative intermediate degree of significance,
    (f) circuit means controlled by said information presentation means addressing said data storage means for locating data in respect of a particular problem presentation, and
    (g) circuit means responsive both to signals produced in accordance with the response states of said manually operable elements and to data stored by said data storage means in respect of each problem to assess a response and produce a presentation control signal dependent upon this assessment.

8. In an automatic teaching machine the combination of,
    (a) information presentation means providing a plurality of information presentations selectively, said presentations including expository and problematic presentations which are interrelated phases of a common theme,
    (b) response means having a plurality of manually operable elements,
    (c) means identifying said manually operable elements individually with items of response information in respect of more than one related of said problematic presentations, (d) means for successively entering groups of plural responses,
(e) means for recording the sequence of the entered groups,
(f) data storage means storing predetermined data in respect of each problem presentation, said data specifying the plural elements of each of said groups and the sequence of the plural groups,
(g) circuit means controlled by said information presentation means addressing said data storage means for locating data in respect of a particular problem presentation,
(h) circuit means responsive both to signals produced by said entering and recording means and to data stored by said data storage means in respect of interrelated problematic presentations to determine the correspondence between said groups of plural responses and the sequence of the entered groups and such groups of plural responses and the sequence of such groups as represented by the stored data, said circuit means producing a presentation control signal dependent upon the degree of said correspondence, and
(i) presentation control circuit means effective to determine a subsequent presentation in dependence upon said presentation control signal.

References Cited

UNITED STATES PATENTS

| | | | |
|---|---|---|---|
| 3,121,960 | 2/1964 | Uttal et al. | 35—9 |
| 3,137,948 | 6/1964 | Wyckoff | 35—9 |
| 3,141,243 | 7/1964 | Chapman et al. | 35—9 |
| 3,292,276 | 12/1966 | Hansel | 35—9 |
| 3,344,534 | 10/1967 | Anschutz et al. | 35—9 |

EUGENE R. CAPOZIO, Primary Examiner

P. V. WILLIAMS, Assistant Examiner